US008345575B2

(12) United States Patent
Watanabe et al.

(10) Patent No.: US 8,345,575 B2
(45) Date of Patent: Jan. 1, 2013

(54) TRAFFIC ANALYSIS APPARATUS AND ANALYSIS METHOD

(75) Inventors: Yoshinori Watanabe, Chigasaki (JP); Yusuke Shomura, Kokubunji (JP); Kenichi Yoshida, Kitamoto (JP)

(73) Assignee: ALAXALA Networks Corporation, Kanagawa (JP)

( * ) Notice: Subject to any disclaimer, the term of this patent is extended or adjusted under 35 U.S.C. 154(b) by 214 days.

(21) Appl. No.: 11/832,238

(22) Filed: Aug. 1, 2007

(65) Prior Publication Data

US 2008/0123545 A1  May 29, 2008

(30) Foreign Application Priority Data

Nov. 29, 2006 (JP) .................................. 2006-321020

(51) Int. Cl.
*G01R 31/08* (2006.01)
(52) U.S. Cl. ........................................................ 370/253
(58) Field of Classification Search .................. 370/253; 726/11–15, 24, 22–23; 713/153, 154
See application file for complete search history.

(56) References Cited

U.S. PATENT DOCUMENTS

| 7,051,369 | B1* | 5/2006 | Baba ................................ 726/23 |
| 7,272,115 | B2* | 9/2007 | Maher et al. ................... 370/253 |
| 7,331,060 | B1* | 2/2008 | Ricciulli .......................... 726/22 |
| 7,411,957 | B2* | 8/2008 | Stacy et al. .................... 370/392 |
| 7,426,634 | B2* | 9/2008 | Jain ................................ 713/151 |
| 7,460,487 | B2* | 12/2008 | Hao et al. ....................... 370/253 |
| 7,590,113 | B1* | 9/2009 | Boxmeyer et al. ............. 370/389 |
| 2003/0108042 | A1* | 6/2003 | Skillicorn et al. ............. 370/389 |
| 2003/0145232 | A1* | 7/2003 | Poletto et al. .................. 713/201 |
| 2004/0215976 | A1* | 10/2004 | Jain ................................ 713/201 |
| 2005/0125195 | A1* | 6/2005 | Brendel .......................... 702/182 |
| 2007/0044147 | A1* | 2/2007 | Choi et al. ........................ 726/12 |
| 2007/0094730 | A1* | 4/2007 | Bhikkaji et al. ................. 726/24 |
| 2007/0110053 | A1* | 5/2007 | Soni et al. ...................... 370/389 |
| 2007/0245417 | A1* | 10/2007 | Lee et al. ......................... 726/22 |
| 2008/0262991 | A1* | 10/2008 | Kapoor et al. ................... 706/20 |
| 2008/0307524 | A1* | 12/2008 | Singh et al. ..................... 726/22 |

FOREIGN PATENT DOCUMENTS

| JP | 2005-285048 | 10/2005 |
| JP | 2006-314077 | 11/2006 |
| JP | 2006-319693 | 11/2006 |

OTHER PUBLICATIONS

"NetHost: Aggregation of Traffic Summary Per-Host" by Tatsuya Mori, et al, pp. S-37-S-38. (English Translation attached pp. 1-6).

(Continued)

*Primary Examiner* — Mark Rinehart
*Assistant Examiner* — Matthew Hopkins
(74) *Attorney, Agent, or Firm* — Brundidge & Stanger, P.C.

(57) ABSTRACT

A traffic analysis apparatus includes: a packet transmitter/receiver; a packet aggregating unit, for adding the number of packets that employ the same values for items in a combination that includes one arbitrary item or multiple items in packets obtained by the packet transmitter/receiver; a variety aggregating unit, for adding the number of appearances of different values in the items that are not included in the combination; and a packet estimation unit for, when the total number of packets is greater than a designated threshold value, employing a relationship between the values of the items of the combination formed of one arbitrary item or multiple items, the number of appearances of different values and the threshold value, and estimating the characteristics of the packets for which the number has exceeded the threshold value.

10 Claims, 18 Drawing Sheets

OTHER PUBLICATIONS

Notification of Reasons for Refusal, issued by Japanese Patent Office in corresponding Japanese Patent Application No. 2006-321020 on Nov. 16, 2010 along with English Language Translation.

IEIECE—Technical Report: IN2005-47, T. Isobe et al., "Anomaly Detection Mechanism for Wide Area Network", Jul. 2005 (with partial English language translation (Section 4,3)).

IEICE—Technical Report: NS2005-2, T. Matsuda et al., "Proposal of Traffic Features for P2P Discrimination", Apr. 2005 (with partial English language translation (Section 3)).

IEICE—Technical Report: NS2006-94, T. Mori et al., "[Encouragement Talk] NetDelta: Method for detailed, long-term analysis of massive amount of data traffic", Sep. 2006 (with English Language abstract printed on front).

* cited by examiner

| 108a | ENTRY NUMBER | 1 | 2 | ... |
|---|---|---|---|---|
| 108b | ITEM SET VALUE | 0x05 | 0x09 | ... |
| 108c | TRANSMISSION SOURCE IP ADDRESS | 20 | 10.0.0.2 | ... |
| 108d | DESTINATION IP ADDRESS | 10.0.0.1 | 10 | ... |
| 108e | TRANSMISSION SOURCE PORT NUMBER | 15 | 85 | ... |
| 108f | DESTINATION PORT NUMBER | 80 | 135 | ... |
| 108g | PACKET COUNT | 63 | 85 | ... |
| 108h | AGGREGATED BYTE COUNT | 12510 | 5440 | ... |
| 108i | COUNT START TIME | 14:10:25 | 14:23:10 | ... |

FIG.4

| | | | | | | | | |
|---|---|---|---|---|---|---|---|---|
| 109a — ENTRY NUMBER | 1 | 2 | 3 | 4 | 5 | 6 | ... |
| 109b — ITEM SET VALUE | 0x05 | 0x06 | 0x08 | 0x09 | 0x0a | 0x07 | ... |
| 109c — THRESHOLD VALUE | 100 | 100 | 100 | 100 | 100 | 100 | ... |
| 109d — ITEM SET LIST FOR UPDATING VARIETY COUNT | 0x00 | 0x00 | 0x00 | 0x08 | 0x08 | 0x05 | ... |
| | | | | 0x00 | 0x00 | 0x06 | ... |
| | | | | | | 0x00 | ... |
| | | | | | | | ... |
| | | | | | | | ... |
| | | | | | | | ... |

| | | | | | | |
|---|---|---|---|---|---|---|
| 110a — ITEM SET VALUE | 1 | 2 | 3 | ... | 15 |
| 110b — PACKET COUNT TABLE ENTRY NUMBER | 0 | 120 | 45 | ... | 0 |

| | | | | | |
|---|---|---|---|---|---|
| 111a | ENTRY NUMBER | 1 | 2 | 3 | ... |
| 111b | IP ADDRESS | 10.0.0.1 | 10.0.0.2 | 10.0.1.1 | ... |
| 111c | HOST TYPE | SERVER | CLIENT | SERVER | ... |
| 111d | SERVICE PORT NUMBER | 80 | 135 | 14336 | ... |
| 111e | DETECTION THRESHOLD VALUE | 100 | 100 | 100 | ... |
| 111f | SENDER COUNT (IN) | 10 | 5 | 42 | ... |
| 111g | RECIPIENT COUNT (OUT) | 24 | 5 | 39 | ... |
| 111h | MEASURED PERIOD (IN) [SECOND] | 72 | 30 | 620 | ... |
| 111i | MEASURED PERIOD (OUT) [SECOND] | 115 | 24 | 510 | ... |
| 111j | AVERAGE BAND (IN) [Mbps] | 0.2 | 0.02 | 0.82 | ... |
| 111k | AVERAGE BAND (OUT) [Mbps] | 1.5 | 0.5 | 0.44 | ... |
| 111l | DDoS ATTACK / NETWORK SCAN FLAG | 0 | 0 | 0 | ... |
| 111m | LATEST UPDATE TIME | 14:13:30 | 14:14:05 | 14:03:15 | ... |

| | | | | |
|---|---|---|---|---|
| 112a | ENTRY NUMBER | 1 | 2 | ... |
| 112b | IP ADDRESS | 10.0.0.1 | 10.0.1.1 | ... |
| 112c | P2P ESTIMATION FLOW DETECTION COUNT | 32 | 54 | ... |
| 112d | P2P ESTIMATION RESULTS | 0 | 1 | ... |
| 112e | VARIETY COUNT DISTRIBUTION PARAMETER A (DIP:DPT) | a = 0.32<br>b = 44.6<br>c = 0.34 | a = 0.92<br>b = 0.64<br>c = 0.85 | ... |
| 112f | VARIETY COUNT DISTRIBUTION PARAMETER B (DIP:SPT) | a = 0.10<br>b = 14.0<br>c = 0.02 | a = 0.65<br>b = 2.27<br>c = 0.77 | ... |

| | | |
|---|---|---|
| 113a | DDoS ESTIMATION THRESHOLD VALUE | 0.8 |
| 113b | NETWORK SCAN ESTIMATION THRESHOLD VALUE | 0.8 |
| 113c | P2P ESTIMATION, VARIETY COUNT DISTRIBUTION PARAMETER A THRESHOLD VALUE | $0.6 \leq a \leq 2.0$<br>$-4 \leq b \leq 4$<br>$0.65 \leq c$ |
| 113d | P2P ESTIMATION, VARIETY COUNT DISTRIBUTION PARAMETER B THRESHOLD VALUE | $0.25 \leq a \leq 2.0$<br>$-4 \leq b \leq 4$<br>$0.65 \leq c$ |

113

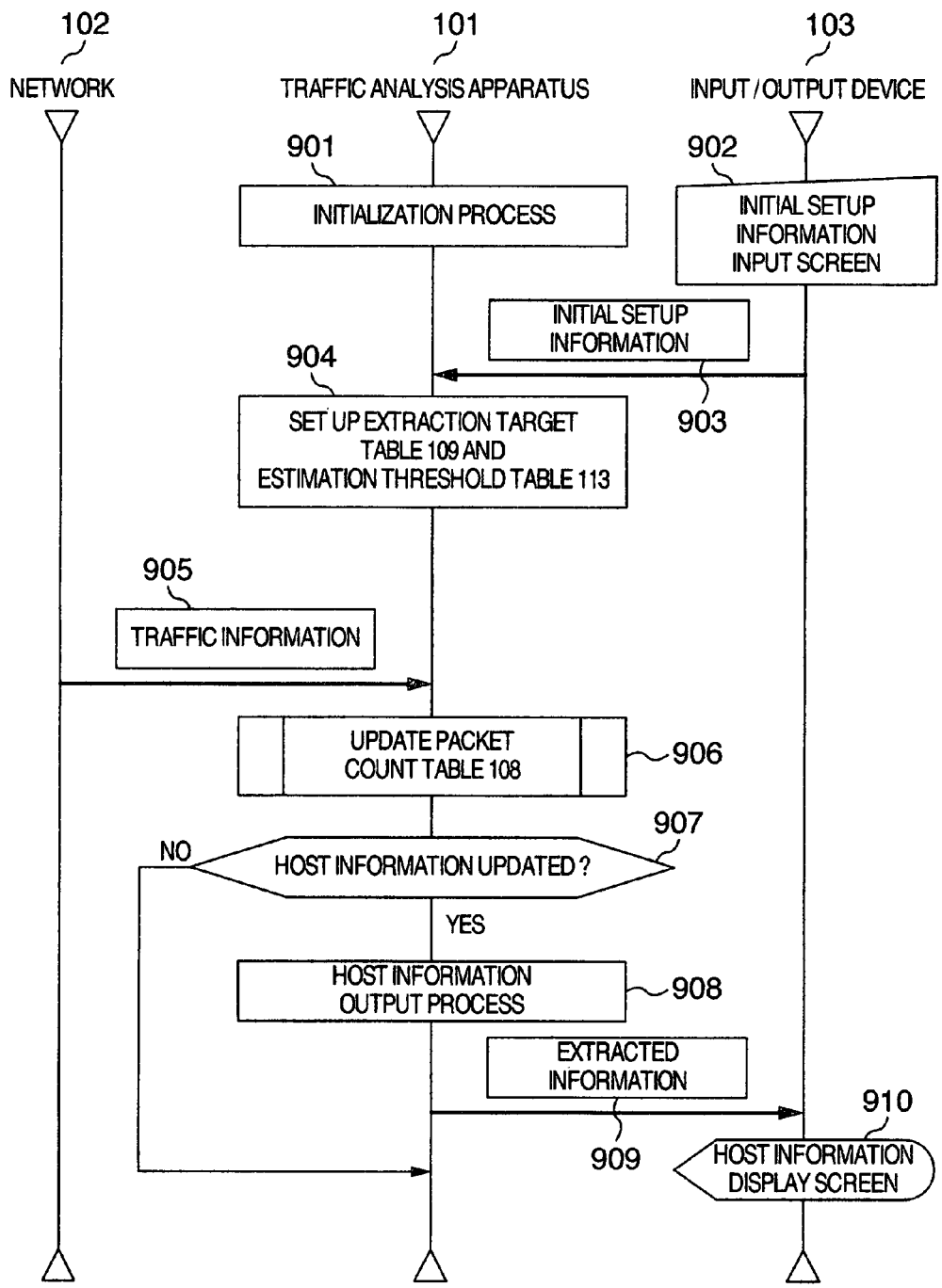

FIG.15

HOST INFORMATION — 910

SERVER LIST: — 910a

| DDoS | IP ADDRESS | PORT NUMBER | TRANSMISSION BAND | RECEPTION BAND |
|---|---|---|---|---|
|  | 10.0.0.1 | 80 | 1.50 | 0.20 |
|  | 10.0.1.1 | 14366 | 0.84 | 0.82 |
|  | 10.12.5.2 | 25 | 0.13 | 0.18 |
| ● | 10.5.0.95 | 80 | 0.33 | 3.27 |
|  | 10.0.32.8 | 80 | 2.11 | 0.59 |

CLIENT LIST: — 910b

| Scan | IP ADDRESS | PORT NUMBER | TRANSMISSION BAND | RECEPTION BAND |
|---|---|---|---|---|
|  | 10.0.0.2 | 135 | 0.50 | 0.02 |
|  | 10.0.1.15 | 80 | 0.28 | 3.21 |
| ● | 10.0.4.99 | 445 | 0.03 | 0.00 |
|  | 10.2.0.47 | 80 | 0.10 | 0.42 |
|  | 10.5.0.10 | 80 | 0.41 | 1.34 |

P2P FILE EXCHANGE HOST LIST: — 910c

| IP ADDRESS | PORT NUMBER |
|---|---|
| 10.0.1.1 | 14366 |

FIG.17

| | | | | |
|---|---|---|---|---|
| 212a — ENTRY NUMBER | 1 | 2 | ... |
| 212b — IP ADDRESS | 10.0.0.1 | 10.0.1.1 | ... |
| 212c — P2P ESTIMATION FLOW DETECTION COUNT | 32 | 54 | ... |
| 212d — P2P ESTIMATION RESULTS | 0 | 1 | ... |
| 212e — DIP VARIETY COUNT AVERAGE | 46.3 | 55.1 | ... |
| 212f — DPT VARIETY COUNT AVERAGE | 2.2 | 25.2 | ... |

| | |
|---|---|
| 213a — DDoS ESTIMATION THRESHOLD VALUE | 0.8 |
| 213b — NETWORK SCAN ESTIMATION THRESHOLD VALUE | 0.8 |
| 213c — P2P ESTIMATION, DIP VARIETY COUNT THRESHOLD VALUE | 10 |
| 213d — P2P ESTIMATION, DPT VARIETY COUNT THRESHOLD VALUE | 5 |

HOST INFORMATION — 1911

SERVER LIST: — 1911a

| DDoS | IP ADDRESS | PORT NUMBER | THE NUMBER OF CLIENTS |
|---|---|---|---|
|  | 10.0.0.1 | 80 | 10 |
|  | 10.0.1.1 | 14366 | 42 |
|  | 10.12.5.2 | 25 | 7 |
| ● | 10.5.0.95 | 80 | 98 |
|  | 10.0.32.8 | 80 | 12 |

CLIENT LIST: — 1911b

| Scan | IP ADDRESS | PORT NUMBER | THE NUMBER OF SERVERS |
|---|---|---|---|
|  | 10.0.0.2 | 135 | 5 |
|  | 10.0.1.15 | 80 | 3 |
|  | 10.0.4.99 | 445 | 100 |
| ● | 10.2.0.47 | 80 | 12 |
|  | 10.5.0.10 | 80 | 8 |

P2P FILE EXCHANGE HOST LIST: — 1911c

| IP ADDRESS | PORT NUMBER |
|---|---|
| 10.0.1.1 | 14366 | ure 1
TRAFFIC ANALYSIS APPARATUS AND ANALYSIS METHOD

INCORPORATION BY REFERENCE

The present application claims priority from Japanese application JP2006-321020 filed on Nov. 29, 2006, the content of which is hereby incorporated by reference into this application.

BACKGROUND OF THE INVENTION

1. Field of the Invention

The present invention relates to a traffic analysis apparatus and a traffic analysis method for analyzing the characteristic of traffic on a network. The present invention relates in particular to a traffic analysis apparatus and a traffic method for efficiently detecting, in a large volume of traffic, that traffic which requires and employs extraordinarily broad bands, and for detecting and indicating the characteristic of that traffic.

2. Description of the Related Art

As the use of the Internet and LANs has grown, becoming ever more popular, the stable operation of these networks has likewise dramatically increased in importance. Thus, especially since a huge, though actually unspecified, number of users may, and do, download and employ a great variety of applications that are available on the Internet, and because, therefore, the probability is high either that the volume of regular traffic will increase and eventually exceed that which has been estimated, by Internet service providers, for example, or that there will be a drastic increase in malicious software traffic for the distribution of malware such as worms and viruses, how to detect and how to ascertain the characteristics of such varied traffic has become a problem for which a solution is urgently required.

As means for resolving this problem, a technique by which to specify, for subsequent characterization extraction, excessive and malign transmissions included in a large volume of traffic flowing via a large-scale network, such as the Internet backbone, is disclosed in JP-A-2005-285048. According to this technique, frequent traffic, i.e., traffic that probably is excessive or malign, is extracted from a large volume of traffic data using a basket analysis method, which facilitates the analyzation of a large amount of data and the extraction, from the data, of combinations of items for which the inclusion frequency is high. This technique also includes a feature that permits an analysis to be performed by referring only to the header data portions required for traffic data transmitted via a network.

Further, as a traffic analysis method, "number of varieties", which, as applied, is the determination and use of the number of destination hosts employed by a specific host for communication, has drawn attention since the method can be employed to provide a parameter that is characteristic of a specific type of traffic. When cardinality is employed, an attack that is hard to identify when using only simple information, such as the quantity of communication data, or malign traffic, for which the purpose is network scanning, can be identified comparatively accurately. Cardinality information can also be obtained by referring only to the header information portion of traffic data that is required for transmission via a network. Generally, in order to obtain a count for cardinality, all values that appear (e.g., the addresses of opposite communication parties when for cardinality the number of such parties are to be counted) must be stored, and for this, a large memory capacity is required. As one method for providing a solution to this problem, a technique is disclosed in NetHost: Aggregation of Traffic Summary Per-Host, 2006 IEICE General Conference, BS-5-2. According to this technique, instead of directly storing a target value, a hash value is calculated and a data entry is recorded, indicating that the target value appeared in a bit on a bitmap that corresponds to the hash value. In this manner, the required memory size can be reduced, and the hash value can be used for the cardinality count.

According to the conventional art in the JP-A-2005-285048, since a data mining technique is employed for the extraction of excessive or malign traffic, the rapid processing of a large amount of traffic is enabled, without imposing any limitations on a target being monitored and by employing only the header information for packets. However, since information that is useful for cardinality calculations, for identifying traffic characteristics, is not collected, it is not possible to determine the source applications for the frequent traffic data that were extracted, nor is it possible to determine what types of malign traffic were intercepted.

Further, for the technique described in the JP-A-2005-285048, the technique described in NetHost: Aggregation of Traffic Summary Per-Host, for example, may also be employed as means for collecting additional analysis information. However, the technique described in the JP-A-2005-285048 is a method whereby, without physically limiting monitoring target traffic, data mining is performed, while information related to multiple traffic types is stored at the same time. Thus, when this technique and the one in NetHost: Aggregation of Traffic Summary Per-Host are employed together, a cardinality counting memory must be prepared for each of multiple traffic types that are currently being analyzed. As a result, in total, a very large memory capacity is required.

SUMMARY OF THE INVENTION

One objective of the present invention is to provide a traffic analysis apparatus and a traffic analysis method for detecting and extracting malign traffic on a network, such as the Internet backbone network, via which there is an enormous flow of traffic, and for preparing estimations for the characteristics of all malign traffic detected.

Another objective of the present invention is to provide a traffic analysis apparatus and a traffic analysis method that require only a small memory resource, and that enable the extraction of traffic deemed malign and the preparation of estimations for the characteristics of the malign traffic, without imposing any limitations on a target being monitored.

To achieve the objectives, according to the present invention, a traffic analysis apparatus comprises:

an accumulation unit, for aggregating the number of packets for each arbitrary combination of items that are included in a packet header portion that is transmitted;

a unit for aggregating the number of times different values appear that are indicated in items that are not included in the arbitrary combination; and a unit for determining whether a packet count obtained by the accumulation unit is greater than a predetermined threshold value, wherein, when the packet count exceeds the threshold value, the type of packet that is transmitted is determined based on the association among the arbitrary combination of items, the threshold value and the total appearance count aggregated for the different values.

Further, to achieve the above objectives, according to the invention, for the aggregation of the appearance count for different values of an item that is not included in an arbitrary combination of items included in the header portions of packets transmitted, as a unit that stores a value that has already appeared, an arrangement is employed wherein, at a step of adding up the number of packets concerning a new combination, which is obtained by including, in addition, an item that is not included in an arbitrary combination, the appearance of the different value is counted when the new combination first appears.

According to the invention, for the extraction of an improper packet and an estimation prepared for the characteristic of the packet, packet pattern matching, which takes processing time, is not required, and simply a statistic process related to header information of a packet need be performed. Therefore, the invention can also applied be for a fast network along which traffic is heavy.

Further, the number of appearances of different values related to a specific item included in the header of a packet can be added up without a special storage area being prepared for the storage of values that appeared in the past. Therefore, even for a fast network along which traffic is heavy, only a small number of memory resources is required to perform, using the number of varieties, analyses of the traffic characteristics.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram illustrating example contents for an extraction target table according to the first embodiment;

FIG. 5 is a diagram illustrating example contents for an auxiliary table according to the first embodiment;

FIG. 6 is a diagram illustrating example contents for an extraction host table according to the first embodiment;

FIG. 7 is a diagram illustrating example contents for a P2P extraction table according to the first embodiment;

FIG. 8 is a diagram illustrating an example estimation threshold value table according to the first embodiment;

FIG. 9 is a flowchart showing the overview processing performed by the traffic analysis apparatus of the first embodiment;

FIG. 15 is a diagram illustrating an example host information output screen according to the first embodiment;

FIG. 17 is a diagram illustrating example contents of a P2P extraction table according to the second embodiment;

FIG. 18 is a diagram illustrating an example estimation threshold value table according to the second embodiment;

FIG. 22 is a diagram illustrating an example host information output screen according to the second embodiment.

DESCRIPTION OF THE EMBODIMENTS

The preferred embodiments of the present invention will now be described in detail while referring to the accompanying drawings. The present invention is not limited to these embodiments.

[First Embodiment]

Figure 1:
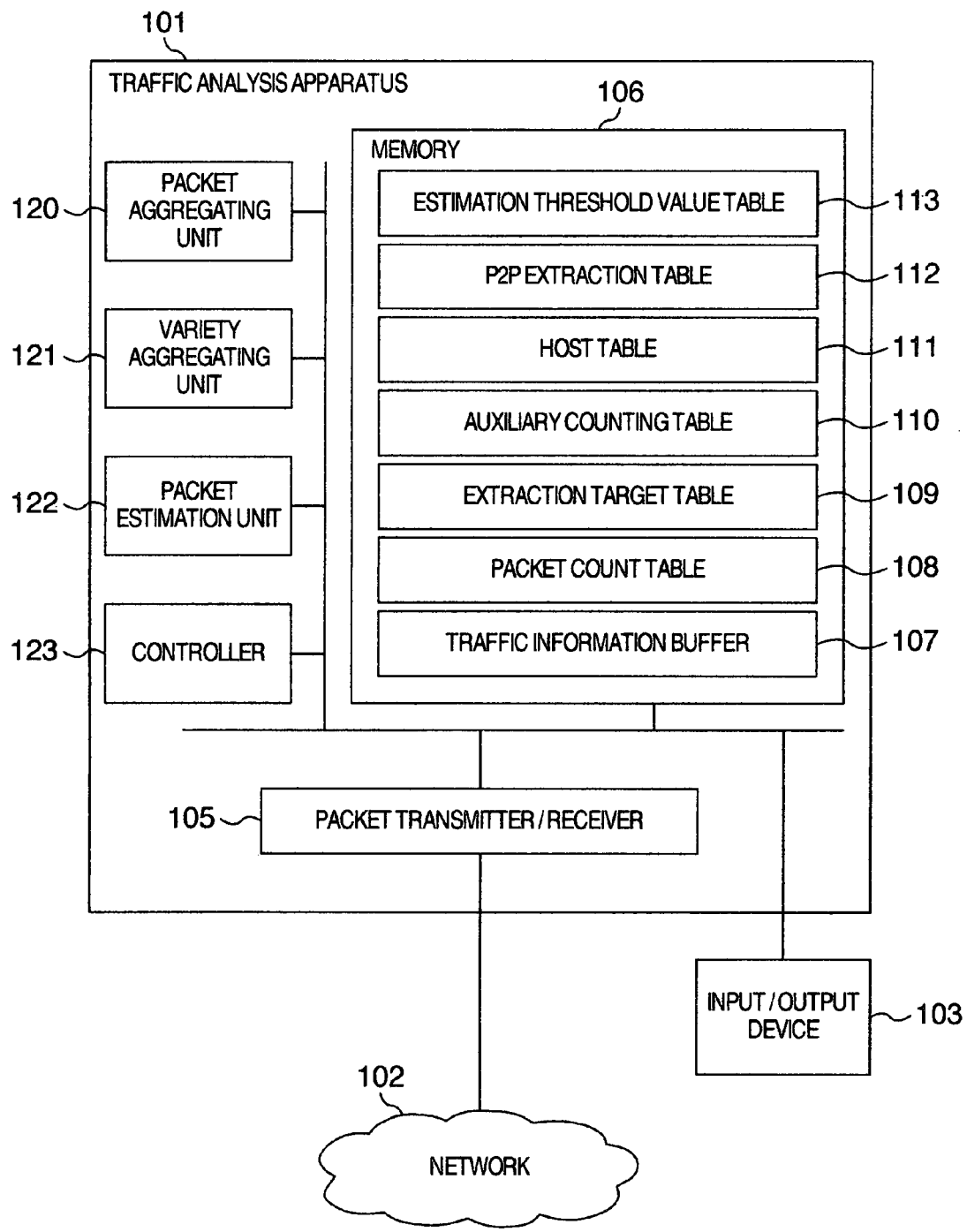
FIG. 1 is a diagram illustrating an example configuration for a traffic analysis apparatus according to a first embodiment of the present invention.

FIG. 1 is a diagram showing the configuration of a traffic analysis apparatus 101 according to a first embodiment of the present invention. In FIG. 1, the traffic analysis apparatus 101 is connected to a network 102 and an input/output device 103. The network 102 is a network via which traffic to be analyzed flows, and the input/output device 103 either issues instructions to the traffic analysis apparatus 101, or displays the analysis results.

The traffic analysis apparatus 101 includes: a packet transmitter/receiver 105, a memory 106, a packet aggregating unit 120, a variety aggregating unit 121, a packet estimation unit 122 and a controller 123.

The packet transmitter/receiver 105 receives, via the network 102, traffic information to be analyzed. The memory 106 includes: a traffic information buffer 107, for temporarily storing the received traffic information; a packet count table 108, for storing a statistical value related to the traffic information; an extraction target table 109, for storing information that designates a type of flow to be extracted from the traffic information; an auxiliary counting table 110, for temporarily storing information required for adding the numbers of the varieties that are included in the statistical value related to the traffic information; a host table 111, for storing the results obtained by estimating, based on the flow type, a host operation related to the flow; a P2P extraction table 112, for storing information, which is required for estimating whether the host operation is a P2P file exchange application, and the estimation results; and an estimated threshold value table 113, for storing threshold value information that is required for estimating a host type.

The packet aggregating unit 120 aggregates the number of packets for which the same value is employed for the individual items of an item group, which is a combination of items (e.g., a transmission source IP address, a transmission destination IP address, a transmission source port number and a destination port number) included in a packet that is exchanged via the network 102. The variety aggregating unit 121 aggregates the number of times a different value has appeared in an item that is not included in the item group. The packet estimation unit 122 employs the aggregation information for estimating the characteristics of packets that are being exchanged via the network 102. The controller 123, for controlling the processing of the traffic analysis apparatus 101, controls the performance of all processing except that which is performed by the packet aggregating unit 120, the variety aggregating unit 121 and the packet estimation unit 122. The packet aggregating unit 120, the variety aggregating unit 121, the packet estimation unit 122 and the controller 123 may be provided using individual hardware components, or may be provided by a single hardware component, such as a CPU, that can perform these processes. Further, software products (programs) for performing the individual processing functions may be prepared and executed by the CPU.

With the above described configuration, the traffic analysis apparatus 101 receives, via the network 102, traffic information that is analyzed and used to estimate whether the traffic is excessive or malign, and displays the estimation results on the input/output device 103.

Example structures of from the packet count table 108 to the estimation threshold value table 113, which are included in the memory 106, will be described while referring to FIGS. 2 to 8. Further, an example operation of the traffic analysis apparatus 101 will be described in detail by employing the flowcharts in FIGS. 9 to 12.

Figures 2, 3:
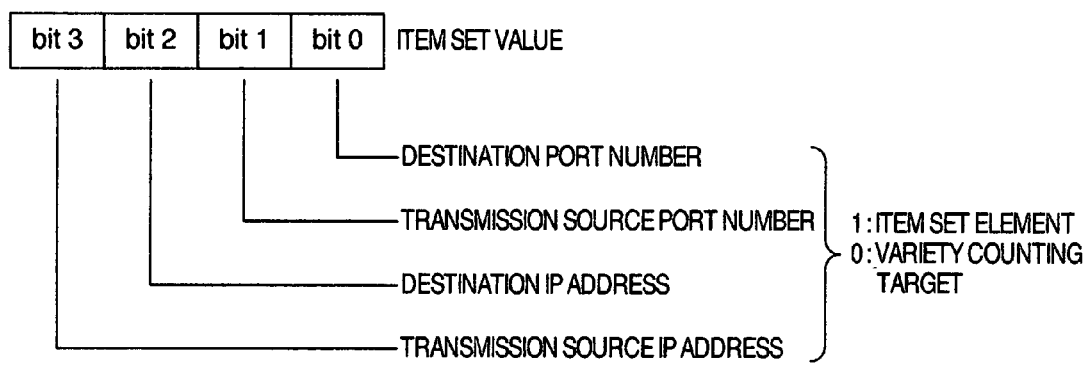
FIG. 2 is a diagram illustrating example contents of a packet count table according to the first embodiment.
FIG. 3 is a diagram illustrating an example structure for bits of an item set value according to the first embodiment.

FIG. 2 is a diagram showing an example for the packet count table 108. For this embodiment, the following analysis system is employed. For individual packets included in traffic information received via the network 102, a specific combination (called an item set) of packet elements is focused on, and the number of packets which have the same value in the combination of the elements (a set of these packets is called a flow) are added up. As a result, a flow to be focused on is extracted from the traffic information, and the operation of a host that is related to the flow is estimated.

The packet count table 108 is used to store the aggregation results, and the result obtained by one aggregation is stored for one entry. One entry includes: an entry number 108a, which uniquely identifies the entry; an item set value 108b, which indicates an item set for a flow of packets to be aggregated for the pertinent entry; a transmission source IP address 108c, which indicates either a transmission source IP address value included in the flow or the number of varieties; a destination IP address 108d, which indicates either a destination IP address value included in the flow or the number of varieties; a transmission source port number 108e, which indicates either a transmission source port number value included in the flow or the number of varieties; a destination port number 108f, which indicates either a destination port number value included in the flow or the number of varieties; a packet count 108g, which indicates the sum of the packets of which the flow consists; an aggregated byte count 108h, which indicates a value obtained by adding the lengths of the packets of which the flow consists; and a counting start time 108i, which is the time at which the aggregation process was started for the entry.

The individual entries stored in the packet count table 108 are results obtained by analyzing the information for packets that are exchanged via the network 102, and may also be regarded as analysis information that includes values entered in the items 108b to 108i. The packet count table 108 can also be regarded as an analysis information storage unit in which those multiple entries (analysis information sets) are stored.

A bit pattern that indicates values to be stored in the item set value 108b is shown in FIG. 3. The value entered in the item set value 108b represents a condition as to whether the values entered in the transmission source IP address 108c, the destination IP address 108d, the transmission source port number 108e and the destination port number 108f either are values used for the elements of the item set, or are variety count values, which indicate how many different types of values appeared.

In the description for this embodiment, four element types, i.e., a transmission source IP address, a destination IP address, a transmission source port number and a destination port number, are employed as the items that form an item set. However, the elements to be processed are not limited to these, and the values of other items included in an IP header, a TCP header or a UDP header, or part of the data that follow the TCP header or the UDP header may be employed in accordance with the purpose of analysis.

Furthermore, the values of other items included in the IP header, the TCP header or the UDP header of an IP packet, which is stored in a packet for tunneling protocol, such as L2TP or PPP, or part of the data that follow the TCP header or the UDP header, may be employed.

FIG. 4 is a diagram showing example contents of the extraction target table 109. The extraction target table 109 is a table wherein the type of flow to be used for a statistical process and the contents of statistical information to be obtained are defined based on traffic information that is received via the network 102. The type of flow and the contents of statistical information to be obtained are defined for one entry. One entry includes: an entry number 109a, which uniquely identifies the entry; an item set value 109b, which indicates the type of flow; a threshold value 109c, which designates a timing for starting the process for estimating a host operation that concerns the flow; and a variety count updating targeted item set 109d that indicates an item set, for which adding up the number of varieties is performed in the entry processing.

FIG. 5 is a diagram showing example contents of the auxiliary counting table 110. The auxiliary counting table 110 is an auxiliary work table employed when the number of varieties is counted using the packet count table 108. In the analysis process for one packet that is included in traffic information received via the network 102, the auxiliary counting table 110 is employed to temporarily store, for each item set for use in the statistical process, the entry number of an entry in the packet count table 108 that is employed for adding up the number of packets and that includes the item set. Specifically, the auxiliary counting table 110 includes a plurality of entries, each of which consists of a field 110a, for storing the item set value of the item set; and a field 110b, storing the entry number.

FIG. 6 is a diagram showing example contents of the host table 111. The host table 111 includes a plurality of entries for storing information, about the operation of a host, that is related to a targeted flow extracted from traffic information received via the network 102. One entry includes: an entry number 111a, which uniquely identifies the entry; an IP address 111b, for the host; a host type 111c, which indicates whether the host is operating as a server or as a client; a service port number 111d, which the host employs to provide a service or to receive a service; a detected threshold value 111e, which indicates the packet count of the targeted flow at the time at which a recording was made for the entry; a sender count (IN) 111f, which indicates the number of hosts serving as transmission sources for the packets included in the targeted flow that the host received; a recipient count (OUT) 111g, which indicates the number of hosts serving as destinations for the packets included in the targeted flow that the host transmitted; a measured period (IN) 111h, which is the time required, from the start of the counting of the packets in the targeted flow the host received, for the count to reach the detected threshold value 111e; a measured period (OUT) 111i, which is the time required, from the start of the counting of the packets in the target flow that the host transmitted, for the count to reach the detected threshold value 111e; an average band (IN) 111j, for storing the average data volume for each hour, from the start of the counting of packets in the targeted flow received by the host, that continued until the count reached the detected threshold value 111e; an average band (OUT) 111k, for storing the average data volume, from the start of the counting of the packets in the targeted flow transmitted by the host, that continued until the count reached the detected threshold value 111e; a DDoS attack/network scan flag 111l, which indicates the results of an estimation made as to whether the targeted flow was a DDOS attack or a network scan; and a latest update time 111m, which indicates the latest time at which the contents of the entry were updated.

FIG. 7 is a diagram showing example contents of the P2P extraction table 112. The P2P extraction table 112 includes a plurality of entries for storing information required to estimate whether the operation of a host related to a targeted flow, which is extracted from traffic information received via the network 102, was a P2P file exchanging application, and the results obtained by the estimation. One entry includes: an entry number 112a, which uniquely identifies the entry; an IP address 112b of the host; a P2P estimation flow detection count 112c, which indicates the number of detected P2P estimation flows that were employed for an estimation as to whether the host operation was a P2P file exchange application; a P2P estimation result 112d, which indicates results obtained by an estimation as to whether the operation was a P2P file exchange application; and a variety count distribution parameter A 112e and a variety count distribution parameter B 112f, which indicate parameters, obtained through calculations based on numerical values included in the statistical values for an extracted P2P estimation flow, that were employed for an estimation as to whether the host operation was a P2P file exchange application. The definitions of the variety count distribution parameter A 112 and the variety count distribution parameter B 112f will be described later in detail in the explanation of the operation.

FIG. 8 is a diagram showing example contents for the estimation threshold value table 113. When an estimation is to be made for the operation of a host related to a flow that is included in traffic information received via the network, numerical values employed as references for the estimation of the type of the flow are entered in the estimation threshold value table 113. The estimation threshold value table 113 includes: a DDOS estimation threshold value 113a, which is used as a reference for a determination as to whether the flow type is DDOS attack; a network scan estimation threshold value 113b, which is used as a reference for a determination as to whether the flow type is a network scan; a P2P estimation, variety count distribution parameter A threshold value 113c and a P2P estimation, variety count distribution parameter B threshold value 113d, which are used as references for a determination as to whether the flow type is a P2P file exchange application.

Next, the operation of the traffic analysis apparatus 101 will be described while referring to the flowchart in FIG. 9. The controller 123 of the traffic analysis apparatus 101 performs the initialization process prior to the analysis process (step 901). Specifically, during the initialization process, the individual entries in the packet count table 108, the host table 111, the P2P extraction table 112 are set in the initial state wherein no data are registered.

Following this, the controller 123 receives initial setup information 903 from the input/output device 103, and enters the initial setup information 903 in the extraction target table 109 and the estimation threshold value table 113 (step 904).

It should be noted that to obtain the information required to form the initial setup information 903, the input/output device 103 displays an initial setup information input screen 902 and then waits for a user input operation.

Figure 14:
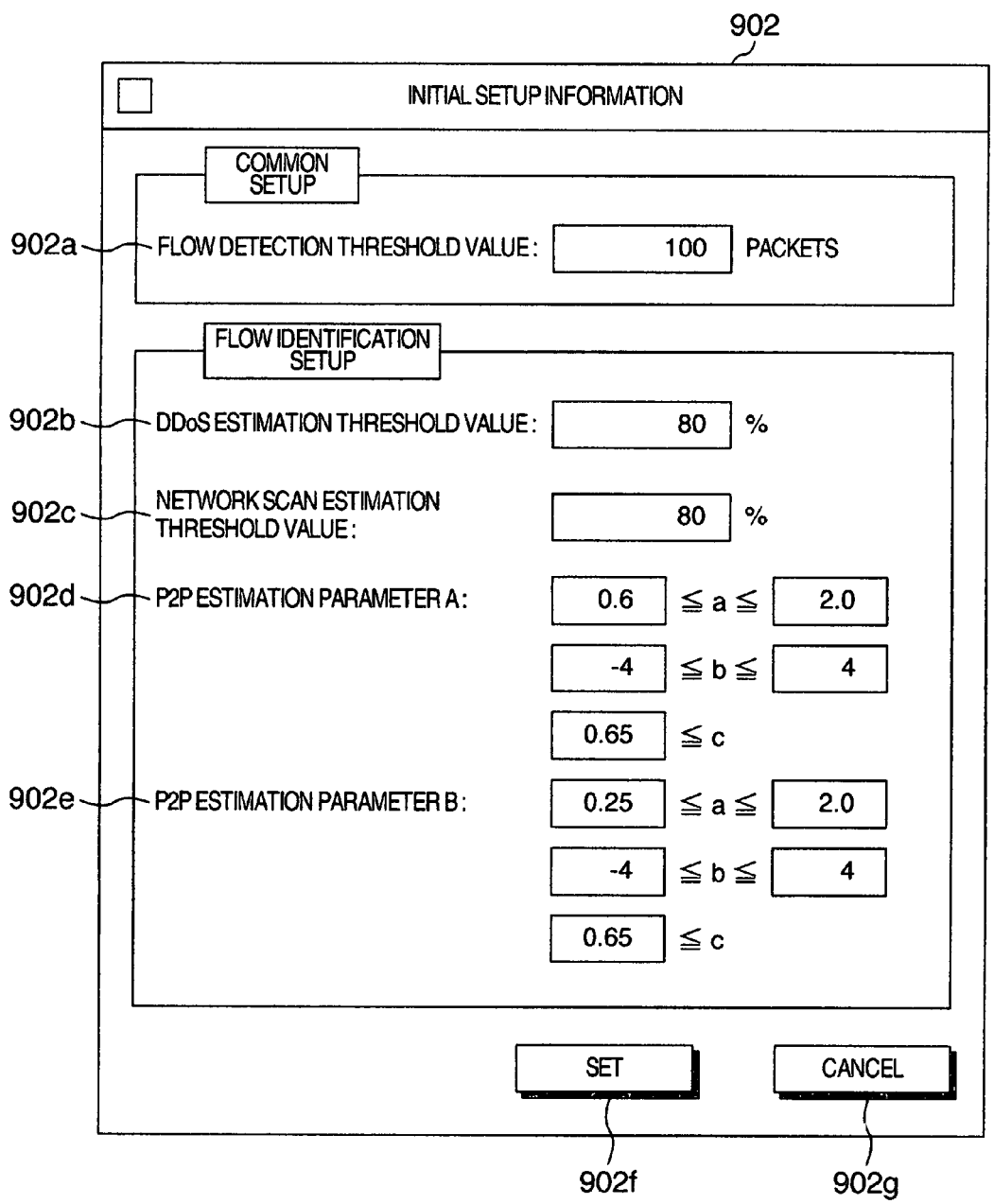
FIG. 14 is a diagram illustrating an example initial setup information input screen according to the first embodiment.

FIG. 14 is a diagram showing an example initial setup information input screen 902. The screen shown in FIG. 14 includes fields for a flow detection threshold value 902a, a DDOS estimation threshold value 902b, a network scan estimation threshold value 902c, a P2P estimation parameter A 902d and a P2P estimation parameter B 902e. When an execution button 902f is clicked on, the values entered in these fields are transmitted, as the initial setup information 903, to the traffic analysis apparatus 101, and the controller 123 writes the values included in this information 903 in the corresponding areas of the extraction target table 109 and the estimation threshold table 113. Specifically, a value input as the flow detection threshold value 902a is entered as the threshold values 109b for all the entries in the extraction target table 109; a value input as the DDoS estimation threshold value 902b is entered as the DDOS estimation threshold value 113a for the threshold value table 113; a value input as the network scan estimation threshold value 902c is entered as the network scan estimation threshold value 113b for the threshold value table 113; a value input as the P2P estimation parameter A 902d is entered as the P2P estimation, variety count distribution parameter A threshold value 113c for the threshold value table 113; and a value input as the P2P estimation parameter B 902e is entered as the P2P estimation, variety count parameter B threshold value 113d for the threshold value table 113.

When the process at step 904 has been completed, the traffic analysis apparatus 101 enters the waiting state for the reception of traffic information from the network 102. In this state, when the packet transmitter/receiver 105 of the traffic analysis apparatus 101 receives traffic information 905 via the network 102, the traffic information 905 is temporarily stored in the traffic information buffer 107. The traffic information 905, for example, is either a copy of a packet that is exchanged via the network 102 or a sFlow packet formed by summarizing portions of multiple packets that are sampled at appropriate intervals.

When the traffic information 905 has been stored in the traffic information buffer 107, the packet aggregation unit 120 begins the updating of the packet count table 108 (step 906). At step 906, for the individual packets that are included in the traffic information 905 stored in the traffic information buffer 107, the statistical process is performed using the packet count table 108. In addition, a flow to be focused on is extracted, the estimation process is performed for the operation of a host related to the flow, and based on the obtained results, the host table 111 and the P2P extraction table 112 are updated. The detailed process will be described later while referring to the flowchart in FIG. 10.

When, as a result of the operation performed at step 906, the contents of the host table 111 and the P2P extraction table 112 have been updated (step 907), the contents of the two tables are output to the input/output device 103, i.e., the host information output process is performed (step 908). During this process, the contents of the two tables are assembled as extracted information 909, and the extracted information 909 is transmitted to the input/output device 103 and displayed on a host information display screen 910.

FIG. 15 is a diagram showing an example host information display screen 910. In this example, entries in the host table 111, the host types 111c that indicate "server", are displayed in a server list 910a; entries, the host types 111c that indicate "client", are displayed in a client list 910b; and an entry in the P2P extraction table 112, for which a value in the P2P estimation result 112d is "1", that indicates a host operation it is estimated is a P2P file exchange application, is displayed in the P2P file exchange host list 910c. Specifically, in the server list 910a and the client list 910b, the values in the IP address 111b, the service port number 111d, the average band (OUT) 111i and the average band (IN) 111h, which are included in the entries for the host table 111, are respectively displayed, on the screen, in columns "IP address", "port number", "transmission band" and "reception band". For an entry, for which "1" is entered for the DDoS attack/network scan flag 111*l*, a specific mark is displayed in column "DDOS" or "Scan". In the P2P file exchange host list 910*c*, values in the IP addresses 112*b* of the entries for the P2P extraction table 112 are displayed in column "IP address". Then, the host table 111 is searched for entries the IP addresses of which indicate a value in the IP address 112*b* and the host types of which are "server". Thereafter, values in the service port numbers 111*d* of the entries that are found are displayed in column "port number".

The operation of the traffic analysis apparatus 101 has been described, and the processing at steps 906 through 908 is repeated each time traffic information 905 is received via the network 102.

The processing at step 906 for updating the packet count table 108 will now be described in detail while referring to the flowchart in FIG. 10.

At step 906, for packets included in the traffic information 905, the statistical process is performed for each designated item set in the extraction target table 109, to permit the packet count table 108 to reflect the obtained results. For this process, first, the packet aggregation unit 120 prepares a variable i for sequentially scanning the entries in the extraction target table 109, and initializes all the entries as 1 (step 1001).

Then, the packet aggregation unit 120 obtains a value in the item set value 109*b*, included in the i-th entry of the extraction target table 109 (step 1002), selects a use entry in the packet count table 108 for storing aggregation information for an item set to be aggregated, for packets stored in the traffic information buffer 107, that corresponds to the item set value 109*b* (step 1003). As a specific selection method, for example, the values of the individual elements of an item set to be aggregated are linked together, a hash function, such as MD5, is applied for the obtained value, the resultant value is divided by the maximum entry count of the packet count table 108, and "1" is added to the remainder. The obtained value is employed as a use entry number.

As another selection method, a plurality of use entry choices are selected using multiple different calculation methods, and when all the selected entries have been currently employed, of the use entries, the entry in which the minimum value is entered in the packet count 108*g* is employed as a use entry number. Using this method, information for a flow that frequently appears tends to remain, without multiple entries having to be prepared in the packet count table 108.

Following this, the packet aggregation unit 120 compares the item set to be aggregated with the item set stored in the use entry, and verifies the contents of the use entry (step 1004). When the use entry is in the unused state, or when the item set to be aggregated is different from the item set stored in the use entry, the processing at steps 1005 to 1007 is performed.

The process performed at step 1005 is the initialization of the use entry. During this process, the item set value obtained at step 1002 is entered in the item set value 108*b* of the use entry. And as for the transmission source IP address 108*c*, the destination IP address 108*d*, the transmission source port number 108*e* and the destination port number 108*f*, element values included in the item set to be aggregated are set for those that are designated, in the item set value, as item set elements, while a value of "0" is set for those that are designated as elements to be used for counting the number of varieties. Further, a value of "0" is set for the packet count 108*g* and the aggregated byte count 108*h*, and the current time is set as the count start time 108*i*.

The process performed at step 1006 is the updating of the auxiliary counting table 110. In the auxiliary counting table 110, the entry number of the use entry is entered in the field of the packet count table entry number 110*b*, in consonance with the field of the item set value 110*a*, the value of which matches the item set value obtained at step 1002.

The process at step 1007 is a process for counting the number of varieties. This process will be described later in detail while referring to the flowchart in FIG. 11.

At step 1004, when the item set to be aggregated is the same as the item set stored in the use entry, it means that the use entry has already been employed for the statistical process for the item set to be aggregated, and therefore, the processing at steps 1005 to 1007 is not performed.

Sequentially, the packet aggregation unit 120 updates the counter information included in the use entry (step 1008). Specifically, the packet count 108*g* is incremented by one, and the packet length is added to the aggregated byte count 108*h*.

When, as a result of the process performed at step 1008, the value of the packet count 108*g* equals the value in the threshold value 109*c* in the i-th entry of the extraction target table 109 (step 1009), at step 1010, the packet estimation unit 122 performs a host information extraction process. The host information extraction process is a process for estimating the operation of a host related to a flow that is identified by the item set, the packet count of which has exceeded the threshold value. The host table 111 and the P2P extraction table 112 reflect the results of this process. The detailed process will be described later while referring to the flowchart in FIG. 12.

Following this, the packet aggregation unit 120 increments the value of the variable i by one (step 1011), and repetitively performs the processing at steps 1002 to 1011 until the value of the variable i exceeds the total number of entries for the extraction target table 109 (step 1012). The processing at step 906 is thereafter terminated.

The variety counting processing at step 1007 in FIG. 10 will now be described in detail while referring to the flowchart in FIG. 11.

First, the governing principle for the counting of the number of varieties will be briefly described. Assume that the number of varieties of transmission source IP addresses are to be counted for the first flow that includes an item set consisting, for example, of a destination IP address and a destination port number. And assume that a new entry in the packet count table 108 has been prepared for an item set that employs the same values as those in the first flow for a destination IP address and a destination port number, and includes a transmission source IP address as the third element. In this case, the number of the varieties of transmission source IP addresses can be obtained by incrementing it one. Then, whether the second flow has appeared can be easily determined by performing the process at step 1004 in the flowchart in FIG. 10. Step 1007 is performed only when a new second flow has appeared, and corresponds to the portion that actually performs the counting process.

At step 1007, the variety aggregation unit 121 prepares a variable j that is used for sequentially scanning the elements in the variety count updating targeted item set list 109*d* for an entry, in the extraction target table 109, that was to be processed when the process at step 1007 was initiated. And the variety aggregation unit 121 initializes the variable j as "1" (step 1101).

Sequentially, from the variety count updating targeted item set list 109*d* for the entry, in the extraction target table 109, that was to be processed when the process at step 1007 was initiated, the variety aggregation unit 121 extracts the j-th element, and regards this value as "x" (step 1102). When "x" is not 0, the process following step 1104 is continued, or when "x" is 0, the process at step 1007 is terminated.

At step 1104, the variety aggregation unit 121 searches the auxiliary counting table 110 for an entry whose item set value 110a is the same as "x", extracts, from the entry, the value in the packet count table entry number 110b, and regards this value as "y". When the value of "y" is not 0, the process at step 1106 is performed, but when the value of "y" is 0, the process at step 1106 is skipped.

At step 1106, the variety aggregation unit 121 adds "1" to the number of varieties for the pertinent item for an entry for which "y" is present in the entry number 108a of the packet count table 108. This item corresponds to a bit for which the value differs by "x" from the item set value 109b of the entry, in the extraction target table 109, that was to be processed when step 1007 was initiated. This can be easily obtained by calculating the exclusive local sum of the item set value 109b and "x".

Following this, the variety aggregation unit 121 increments the variable j one, and returns to step 1102 and repeats the processing there (step 1107). In this manner, the number of varieties is counted.

Figure 12:
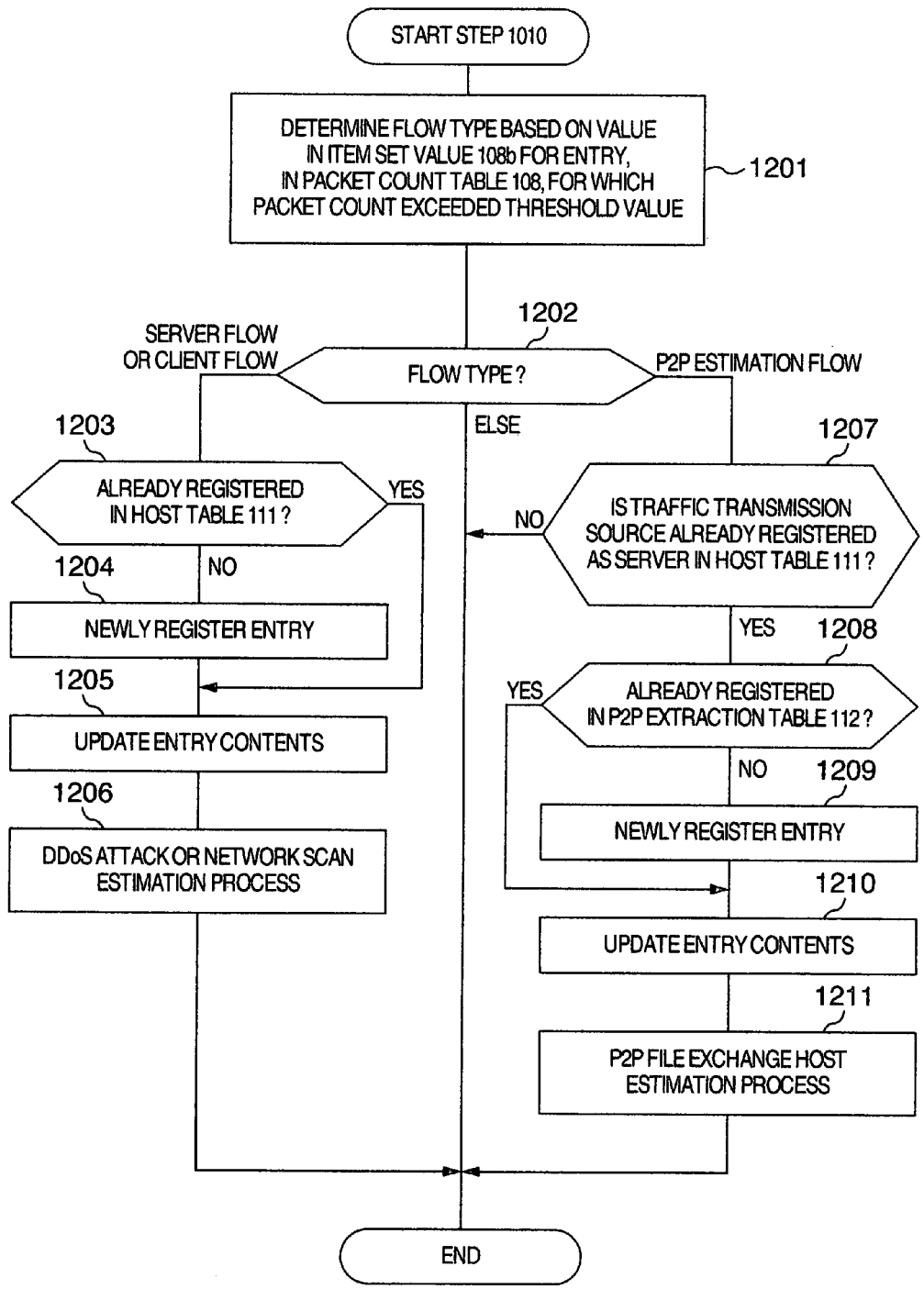
FIG. 12 is a flowchart showing a host information extraction process.

The host information extraction processing at step 1010 in FIG. 10 will now be described in detail while referring to the flowchart in FIG. 12.

The packet estimation unit 122 determines the type of a beyond-threshold flow based on the item set value 108b for the entry, in the packet count table 108, the packet count of which has exceeded the threshold value as a result of the counter updating process performed at step 1008 (step 1201). In this embodiment, a flow type, the item set value of which, in hexadecimal, is 05 (the elements of an item set are a destination IP address and a destination port number) or 0a (the elements of an item set are a transmission source IP address and a transmission source port number), is defined as a server flow. The flow type, the item set of which, in hexadecimal, is 06 (the elements of an item set are a destination IP address and a transmission source port number) or 09 (the elements of an item set are a transmission source IP address and a destination port number), is defined as a client flow. A flow type, the item set of which, in hexadecimal, is 08 (the element of an item set is a transmission source IP address) is defined as a P2P estimation flow. However, the flow types, in this case, are not limited to these three, and another flow type may be defined for a different combination of elements.

When the determination is that the flow type is a server flow or a client flow, the process at steps 1203 through 1206, for updating the host table 111, is performed. But when the determination is that the flow type is a P2P estimation flow, the P2P file exchange host estimation process at steps 1207 through 1211 is performed. In any other case, the processing at step 1010 is terminated (step 1202).

To update the host table 111, first, the packet estimation unit 122 performs and examination to determine whether information for a host related to the beyond-threshold flow has already been registered in the host table 111 (step 1203). When the host information has not yet been registered, this information is newly registered in an unused entry in the host table 111 (step 1204). For the new registration process, information included in the entry, in the packet count table 108, the packet count of which has exceeded the threshold value, is employed, and values are set in the individual fields of the IP address 111b, the host type 111c, the service port number 111d and the detection threshold value 111e of the unused entry.

The information in the entry that is found at step 1203, or that is newly registered at step 1204, is updated in accordance with the information included in the entry, in the packet count table 108, the packet count of which has exceeded the threshold value (step 1205). The fields to be undated are: the sender count (IN) 111f, the recipient count (OUT) 111g, the measured period (IN) 111h, the measured period (OUT) 111i, the average band (IN) 111j, the average band (OUT) 111k and the latest update time 111m.

Finally, the estimation process is performed to estimate whether the host operation indicated in the entry updated at step 1205 is a DDOS attack or a network scan. The estimation result is entered in the DDOS attack/network scan flag. Thereafter, the host table 111 updating process is terminated (step 1206).

The method of this embodiment used to estimate that a host operation is a DDOS attack or a network scan will now be described.

First, a DDOS attack is an activity such that multiple attacking hosts issue access requests to a port number used by a specific host to provide a service. Packets transmitted by these attacking hosts are detected as server flows, and since each of the IP addresses of the attacking hosts is different, it is assumed that the number of varieties of transmission source IP addresses for the server flows is similar to the detection threshold value for server flows. Therefore, an estimated threshold value, which is used to estimate whether or not a server flow that is detected is a DDoS attack, is defined as a ratio of the number of varieties to the detection threshold value. Thus, when the ratio of the number of varieties for the transmission source IP address of the server flow relative to the detection threshold value is greater than the estimated threshold value that has been defined, it is estimated that the pertinent server flow is a DDOS attack. At step 1206, a value stored in the DDOS estimation threshold value 113a of the estimation threshold value table 113 is employed as the estimation threshold value that is defined.

Similarly, a network scan is an activity such that, in order to search for a server, for which a specific host is providing a service using the same port number, an access request is issued to multiple different IP addresses by using the same destination port number. Packets transmitted by the host are detected as a client flow, and the number of varieties for the destination IP address of the client flow is regarded as being similar to the detection threshold value for client flows. Therefore, an estimated threshold value, which is used to estimate whether a client flow that is detected is a network scan, is defined as a ratio of the number of varieties for the destination IP address relative to the detection threshold value. And when the ratio of the number of varieties for the destination IP address of the client flow relative to the detection threshold value is greater than the estimated threshold value that has been defined, it is estimated that the pertinent client flow is a network scan. At step 1206, a value stored in the network scan estimation threshold value 113b of the estimated threshold value table 113 is employed as the estimated threshold value that is defined.

Next, the P2P file exchange host estimation processing, beginning at step 1207, will be described.

In the P2P file exchange host estimation processing, first, the packet estimation unit 122 determines whether information concerning a host related to the beyond-threshold flow has already been registered as a server in the host table 111 (step 1207). This process is performed based on the idea that when the host is a P2P file exchange host, accordingly, a server flow always appears, and therefore, as a necessary requirement, the host should already have been registered as a server in the host table 111 in order to prepare an estimation for P2P file exchange host. When it is not confirmed at step 1207 that the host has already been registered as a server in the host table 111, the processing at step 1010 is terminated without any further processes being performed.

When it is confirmed at step 1207 that the host has already been registered as a server in the host table 111, the packet estimation unit 122 examines the P2P extraction table 112 to determine whether information for a host related to the beyond-threshold flow has already registered (step 1208). When such information has not yet been registered, the information is newly registered in an unused entry of the P2P extraction table 112 (step 1209). The new registration process is a process during which, based on information included in the beyond-threshold entry in the packet count table 108, a value is set in the IP address 112b of the unused entry, and a value of "0" is set in the P2P estimation flow detection count 112c and the P2P estimation results 112d.

Sequentially, the information in the entry that is found at step 1208, or the information newly registered in the entry at step 1209, is updated using the information in the beyond-threshold entry in the packet count table 108 (1210). Specifically, the value in the P2P estimation flow detection count 112c is incremented by one, and the variety count distribution parameter A 112e and the variety count distribution parameter B 112f are calculated.

Prior to explaining the definitions for the variety count distribution parameter A 112e and the variety count distribution parameter B 112f, the P2P file exchange, host estimation method for this embodiment will be described.

Figure 13:
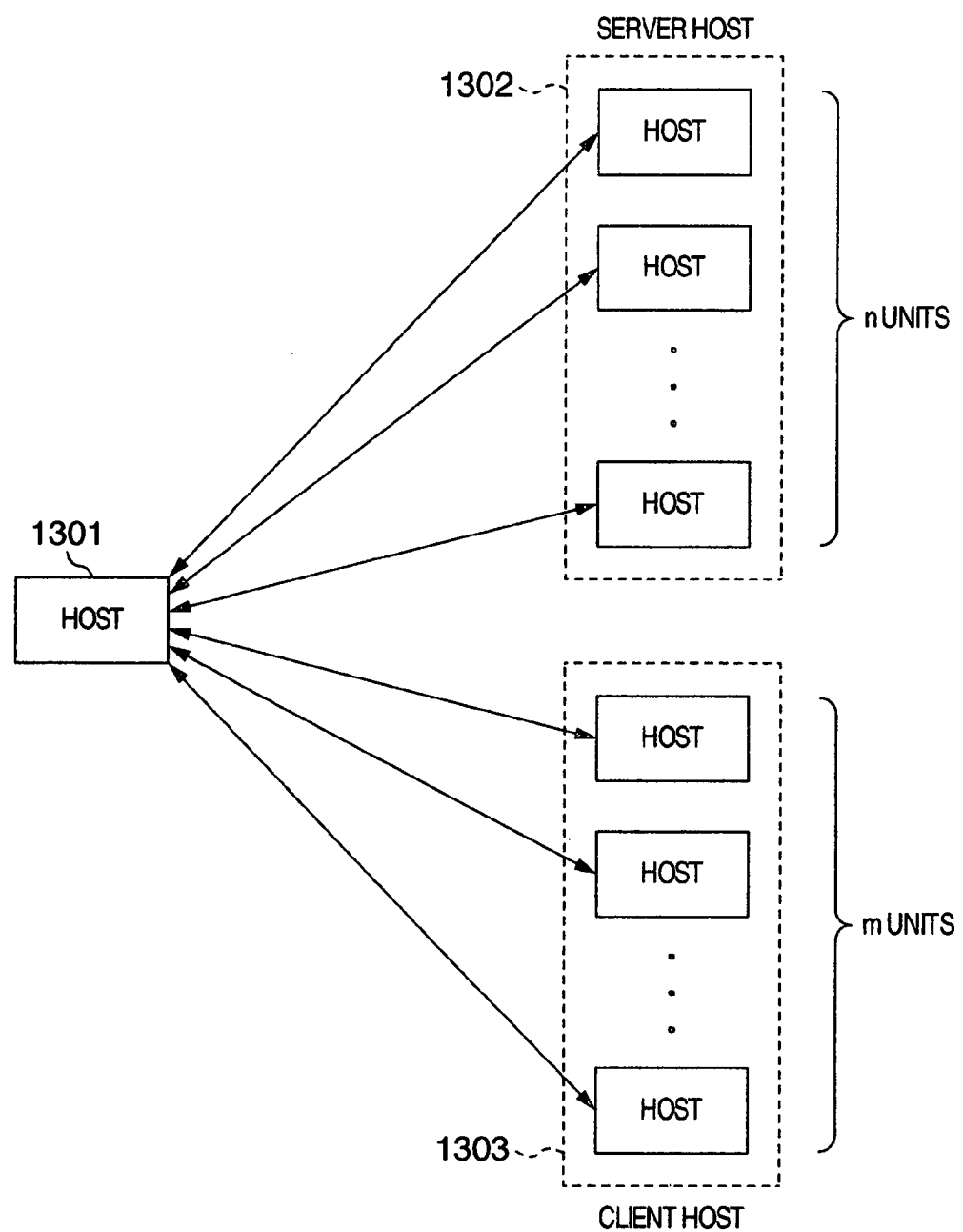
FIG. 13 is a diagram for explaining the outline of a P2P file exchanging process according to the first embodiment.

FIG. 13 is a schematic diagram illustrating P2P file exchange flows. While referring to FIG. 13, a host 1301 is currently performing a P2P file exchange, while n hosts 1302 serve as servers for the host 1301 and m hosts 1303 serve as clients for the host 1301, each of which is also currently performing a P2P file exchange. As the P2P file exchange protocol assumed in this embodiment, a service port number used when a host is operated as a server is determined at random for each host. With this arrangement, for a P2P estimation flow that is detected because it exceeds the threshold value and that employs the host 1301 as a transmission source IP address, the ratio of about (n+m):n:(n+m) is obtained as a ratio of three values, i.e., the number of varieties of destination IP addresses, the number of varieties of transmission source port numbers and the number of varieties of destination port numbers. In the case of n=m, for example, when multiple P2P estimation flows are detected, so long as the ratio of 2:1:2 is obtained for all of the flows, this ratio can be used as one of the bases for estimating that the host 1301 is performing a P2P file exchange. However, actually, since n and m change as time elapses, it is assumed that the ratio includes a fluctuation for each flow. While taking this point into account, in this embodiment, the following estimation method is employed. When a plurality of P2P estimation flows that include the same transmission source IP address are received, a ratio (a first ratio) of the number of varieties of destination IP addresses to the number of varieties of destination port numbers, and a ratio (a second ratio) of the number of varieties of destination IP addresses to the number of varieties of transmission source port numbers are calculated. And when the first ratio distributed is near a value of "1" and the second ratio distributed is near a value of 0.5, and when the host having the transmission source IP address has already been registered as a server in the host table 111, it is estimated that the flow is a P2P file exchange flow.

Specifically, in this embodiment, a method for employing the least-squares method to calculate the ratio and the degree of variance is employed to perform the estimation. In order to confirm the first ratio, using the least-squares method, the detection results for multiple P2P estimation flows are approximated with linear function y=ax+b, where x denotes the variety count of destination port numbers and y denotes the variety count of destination IP addresses, and the values of a and b and the value of a correlation coefficient c are obtained. Then, whether these values are included in a predetermined range is determined. In this manner, the first ratio is confirmed. The combination of a, b and c obtained through calculation is the variety count distribution parameter A 112e. Similarly, for the confirmation of the second ratio, using the least-squares method, the detection results for multiple P2P estimation flows are approximated with linear function y=ax+b, where x denotes the variety count of transmission source port numbers and y denotes the variety count of destination IP addresses, and the values of a and b and the value of a correlation coefficient c are obtained. Then, whether these values are included within a predetermined range is determined. In this manner, the second ratio is confirmed. The combination of the values a, b and c obtained through calculation is the variety count distribution parameter B 112f.

Finally, the packet estimation unit 122 determines whether the values, obtained at step 1210, of the variety count distribution parameter A 112e and the variety count distribution parameter B 112f are respectively included in ranges designated in the P2P estimation variety count distribution parameter A threshold value 113c and the P2P estimation variety count distribution parameter B threshold value 113d of the estimation threshold value table 113. When the values are included in the ranges, it is estimated that the host is a P2P file exchange host, and the value in the P2P estimation results 112d for the pertinent entry is changed to 1 (step 1211).

The operation of the traffic analysis apparatus 101 of the first embodiment has been described.

[Second Embodiment]

Figure 16:
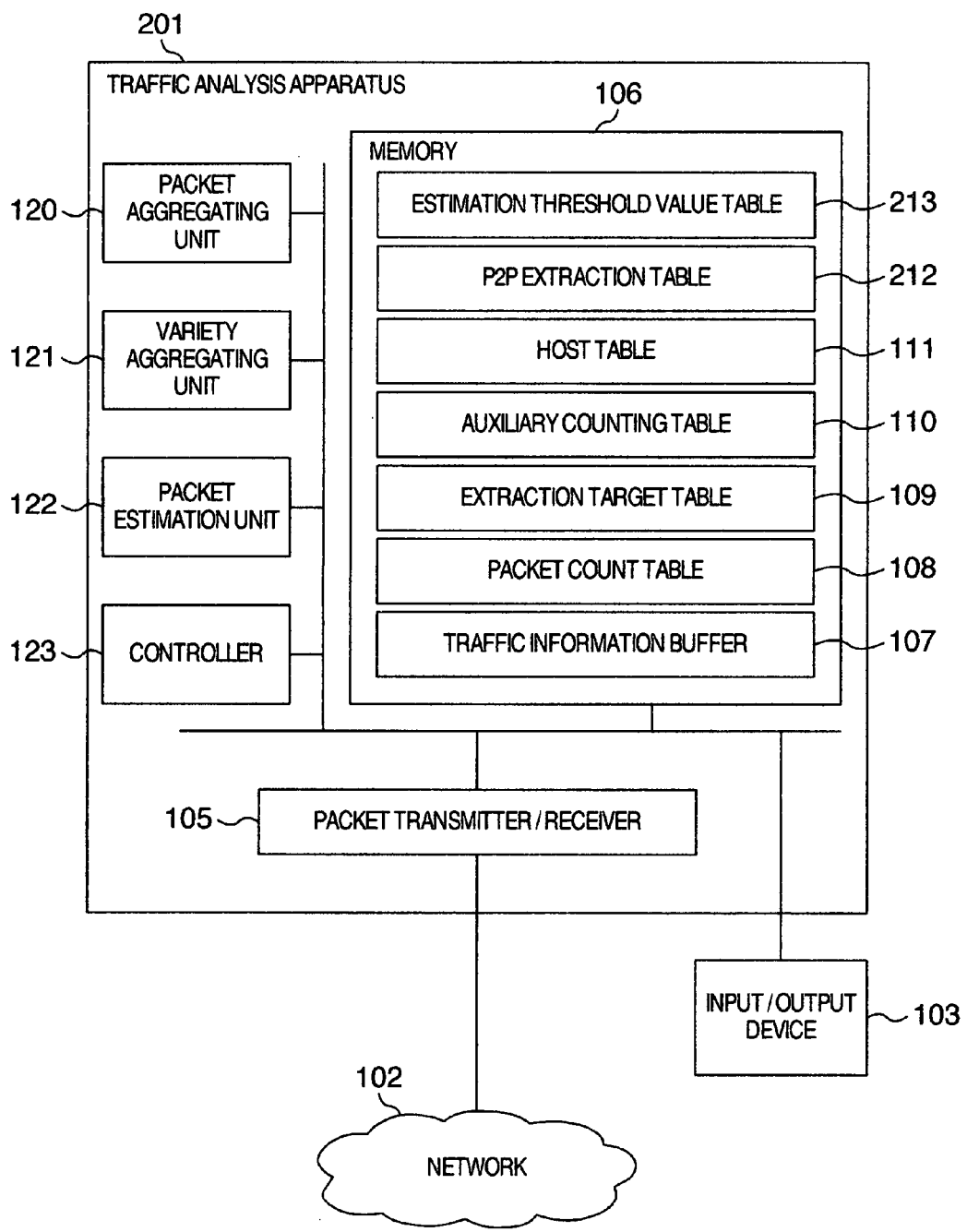
FIG. 16 is a diagram illustrating an example configuration for a traffic analysis apparatus according to a second embodiment of the present invention.

FIG. 16 is a diagram showing the configuration of a traffic analysis apparatus 201 according to a second embodiment of the present invention. A difference in the traffic analysis apparatus 201 in FIG. 16 from the traffic analysis apparatus 101 of the first embodiment is that a P2P extraction table 212 (FIG. 17) and an estimation threshold value table 213 (FIG. 18) are included in a memory 106 (the names of the tables are the same, but the table contents are different). A network 102, an input/output device 103, a packet transmitter/receiver 105, the memory 106, a traffic information buffer 107, a packet count table 108, an extraction target table 109, an auxiliary counting table 110, a host table 111, a packet aggregating unit 120, a variety aggregating unit 121, a packet estimation unit 122 and a controller 123 are the same as those in FIG. 1 for the first embodiment.

FIG. 17 is a diagram showing example contents of the P2P extraction table 212. The P2P extraction table 212 includes a plurality of entries for storing information that is required for estimating whether the operation of a host related to a targeted flow, which is extracted from traffic information received via the network 102, is the P2P file exchange application, and to store results obtained through an estimation. One entry includes: an entry number 212a, which is used to uniquely identify the entry; an IP address 212b of the host; a P2P estimation flow detection count 212c, which indicates the number of detected P2P estimation flows that are employed for estimating whether the host operation is a P2P file exchange application; a P2P estimation results 212d, indicating the results of an estimation as to whether the operation is a P2P file exchange application; and a DIP variety count average 212e and a DPT variety count average 212f, which are obtained based on numerical values included in the statistical values of an extracted P2P estimated flow in order to estimate whether the host operation is a P2P file exchange application. The definitions of the DIP variety count average 212e and the DPT variety count average 212f will be described in detail in the following description of the operation.

FIG. 18 is a diagram showing one example of the estimation threshold value table 213. Values entered in the estimation threshold value 213 are those employed as references to determine a flow type in a process performed for estimating the operation of a host that is related to the flow, which is included in traffic information received via the network 102. The estimation threshold value table 213 includes: a DDOS estimation threshold value 213a, which is used as a reference for determining whether or not the type of the flow is a DDoS attack; a network scan estimation threshold value 213b, which is used as a reference for determining whether or not the type of the flow is a network scan; and a P2P estimation DIP variety count threshold value 213c and a P2P estimation DPT variety count threshold value 213d, which are used as references for determining whether the flow type is a P2P file exchange type.

Figure 19:
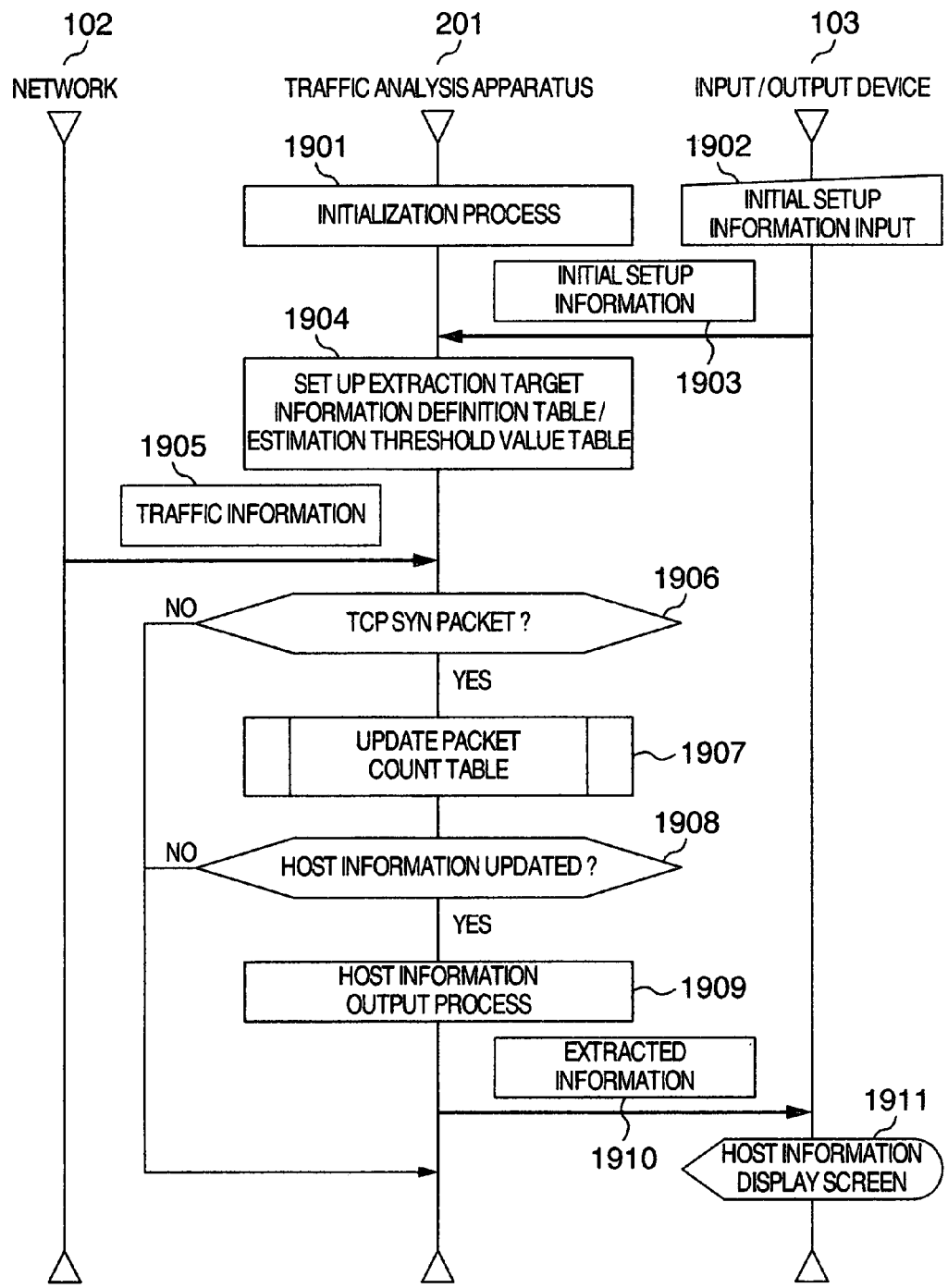
FIG. 19 is a flowchart illustrating the overview of the processing performed by the traffic analysis apparatus of the second embodiment.

Next, the operation of the traffic analysis apparatus 201 of this embodiment will be described. Among the traffic information received via the network 102, the traffic analysis apparatus 201 of this embodiment employs, as a packet for the statistical process, only a TCP SYN packet that represents a communication start request, and performs an estimate for a P2P file exchange host using a method that is different from the one shown in the first embodiment. The operation of the traffic analysis apparatus 201 will now be described while referring to the flowchart in FIG. 19.

The controller 123 of the traffic analysis apparatus 201 performs the initialization process prior to the analysis process (step 1901). Specifically, in the initialization process, entries that form the packet count table 108, the host table 111 and the P2P extraction table 212 stored in the memory 113 are set to the initial state where no data are registered.

Then, the controller 123 receives initial setup information 1903 from the input/output device 103, and enters the initial setup information 1903 in the extraction target table 109 and in an estimation threshold value table 213 (step 1904).

At this time, in order to obtain information required to form the initial setup information 1903, the input/output device 103 displays an initial setup information input screen 1902 and waits for a user input operation.

Figure 21:
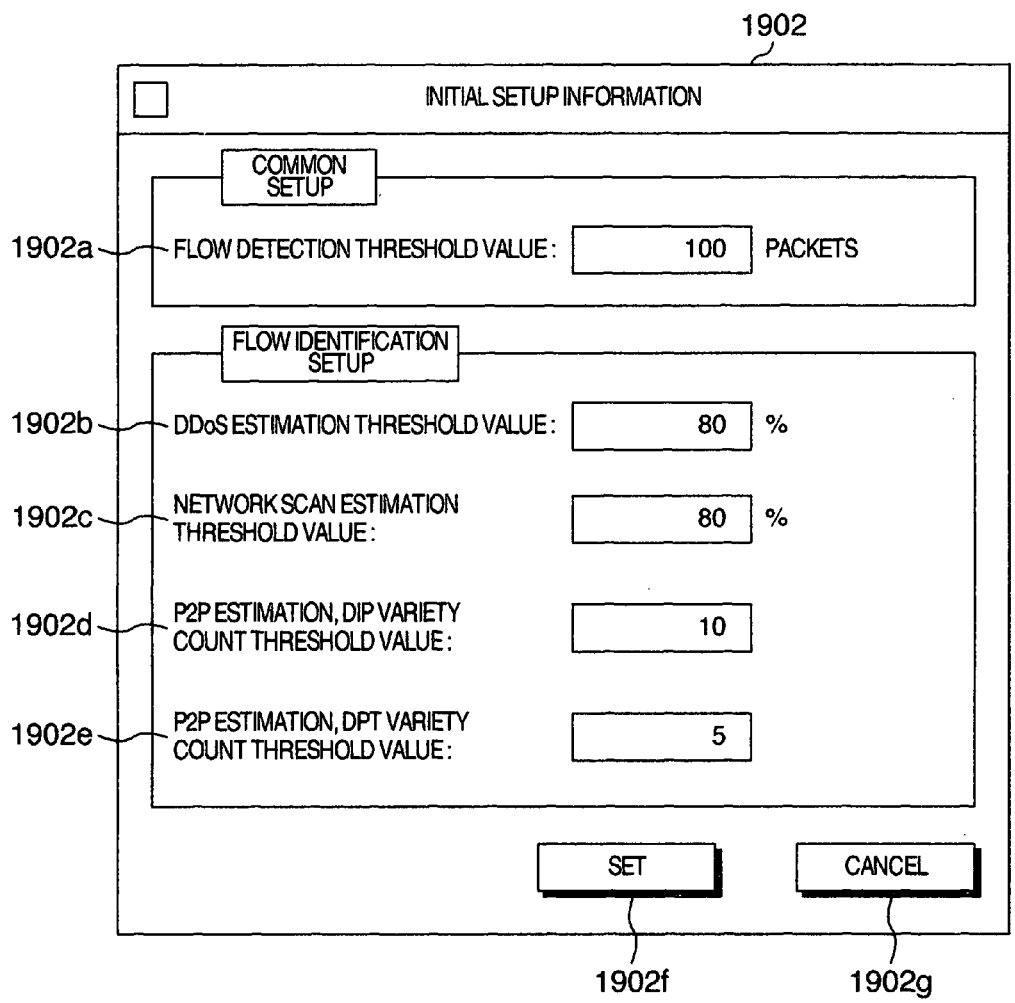
FIG. 21 is a diagram illustrating an example initial setup information input screen according to the second embodiment.

FIG. 21 is a diagram showing an example initial setup information input screen 1902. The screen 1902 in the example in FIG. 21 includes fields for a flow detection threshold value 1902a, a DDOS estimation threshold value 1902b, a network scan estimation threshold value 1902c, a P2P estimation, a DIP variety count threshold value 1902d and a P2P estimation, and a DPT variety count threshold value 1902e. When an execution button 1902f is clicked on, input values in the individual fields are transmitted as the initial setup information 1903 to the traffic analysis apparatus 201, and the controller 123 writes the values included in the initial setup information 1903 in the corresponding areas of the extraction target table 109 and the estimation threshold value 213. Specifically, an input value in the flow detection threshold value 1902a is entered in the threshold values 109b of all the entries in the extraction target table 109. An input value in the DDoS estimation threshold value 1902b is entered in the DDOS estimation threshold value 213a of the threshold value table 213. An input value in the network scan estimation threshold value 1902c is entered in the network scan estimation threshold value 213b of the threshold value table 213. An input value in the P2P estimation, DIP variety count threshold value 1902d is entered in the P2P estimation, DIP variety count threshold value 213c of the threshold value table 213. And an input value in the P2P estimation, DPT variety count threshold value 1902e is entered in the P2P estimation, DPT variety count threshold value 213d of the threshold value table 213.

When the process at step 1904 has been completed, the traffic analysis apparatus 201 enters a wait state for the reception of traffic information from the network 102. In this state, when the packet transmitter/receiver 105 receives traffic information 1905 via the network 102, the traffic information 1905 is temporarily stored in the traffic information buffer 107. The traffic information 1905 is, for example, a copy of the packets that are exchanged via the network 102, or a sFlow packet formed by summarizing the portions of multiple packets that are sampled at appropriate intervals.

When the traffic information 1905 is stored in the traffic information buffer 107, the controller 123 determines whether packets included in the traffic information 1905 are TCP SYN packets (step 1906).

When the packets are TCP SYN packets, the packet aggregating unit 120 starts updating the packet count table 108 (step 1907). At step 1907, only when the packets that are included in the traffic information and that are stored in the traffic information buffer 107 are TCP SYN packets, the statistical process is performed using the packet count table 108, and a flow to be focused on is extracted. Further, the estimation process for the operation of a host related to the flow is performed, and based on the obtained results, the host table 111 and the P2P extraction table 212 are updated. This processing will be described later in detail.

When, as a result of the process performed at step 1907, the host table 111 and the P2P extraction table 212 are updated (step 1908), and the controller 123 outputs the contents of these two tables to the input/output device 103, i.e., performs a host information output process (step 1909). For this process, the contents of the two tables are formed as extracted information 1910, and the extracted information 1910 is transmitted to the input/output device 103, while a host information display screen 1911 is displayed.

FIG. 22 is a diagram showing an example host information display screen 1911. In this example, entries for which "server" is entered in the host type 111c of the host table 111 are displayed in a server list 1911a, and entries for which "client" is entered in the host type 111 are displayed in a client list 1911b. Further, an entry for which "1", indicating that a host operation is estimated to be a P2P file exchange application, is entered in the P2P estimation result 212d of the P2P extraction table 212, is displayed in a P2P file exchange host list 1911c. On the server list 1911a and the client list 1911b, the values in an IP address 111b, a service port number 111d and a sender count (IN) 111f or a recipient count (OUT) 111g, included in the entries in the host table 111, are displayed in columns "IP address", "port number", "client count" and "server count". For the entry for which "1" is entered in the DDOS attack/network scan flag 111l, a mark is displayed in column "DDOS" or "Scan". In the P2P file exchange host list 1911c, the value in the IP address 212b included in the entry in the P2P extraction table 212 is displayed in column "IP address". Further, the host table 111 is examined to find an entry that has, as an IP address, the value in the IP address 212b and that employs "server" as a host type, and the value in the service port number 111d of the entry that is found is displayed in column "port number".

The operation of the traffic analysis apparatus 201 has been described. The processing at steps 1906 to 1909 is repetitively performed each time the traffic information 1905 is received via the network 102.

The process at step 1907 for updating the packet count table 108 will now be described in detail. The process at step 1907 is basically the same as the process at step 906 performed by the traffic analysis apparatus 101 of the first embodiment, and the detailed processing is as shown in the flowcharts in FIGS. 10, 11 and 12. Since the only difference in the second embodiment from the first embodiment is steps 1210 and 1211 in the flowchart in FIG. 12, only this portion will be described.

Figure 10:
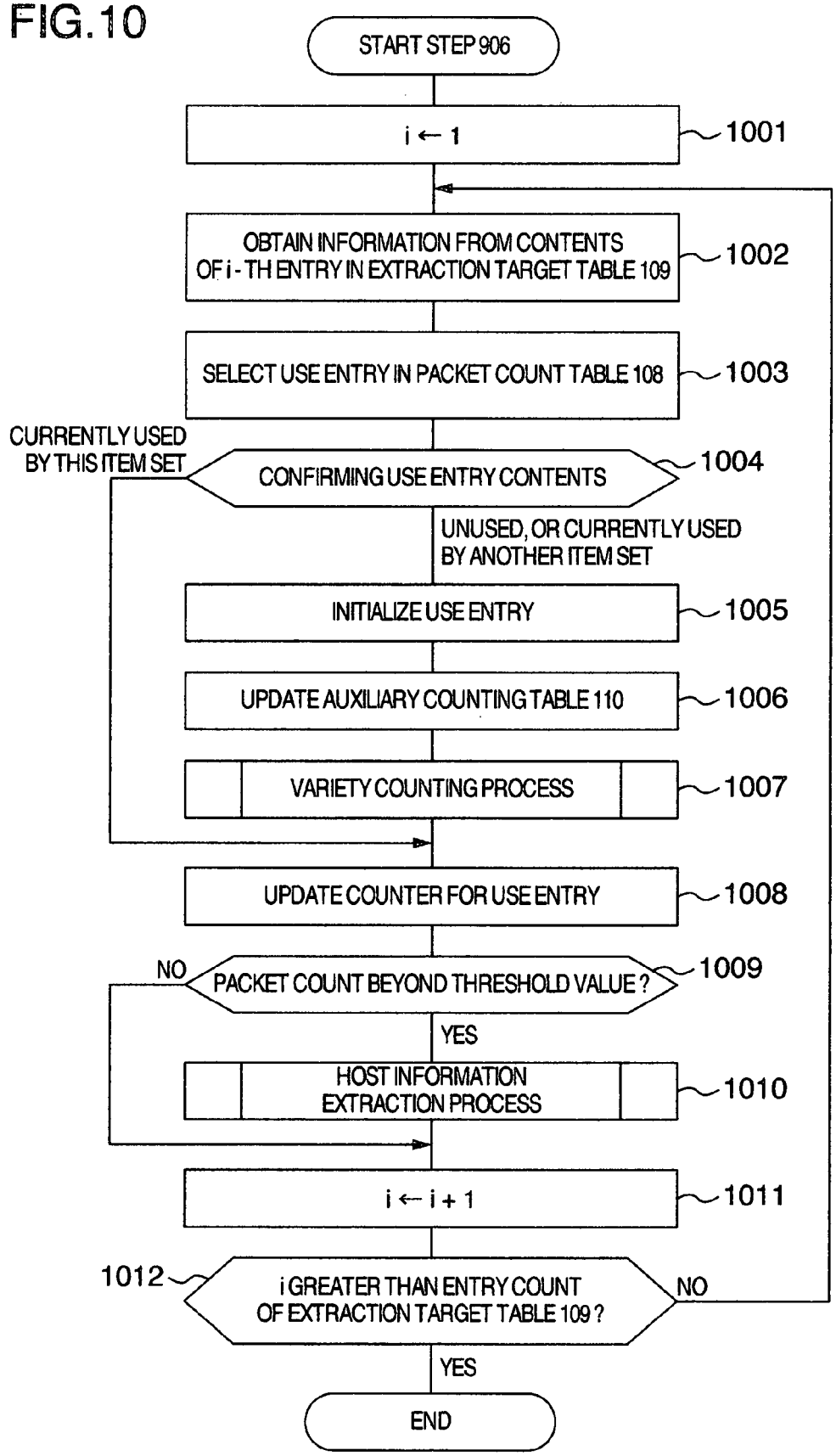
FIG. 10 is a flowchart showing a packet count table updating process for the first embodiment.
Figure 11:
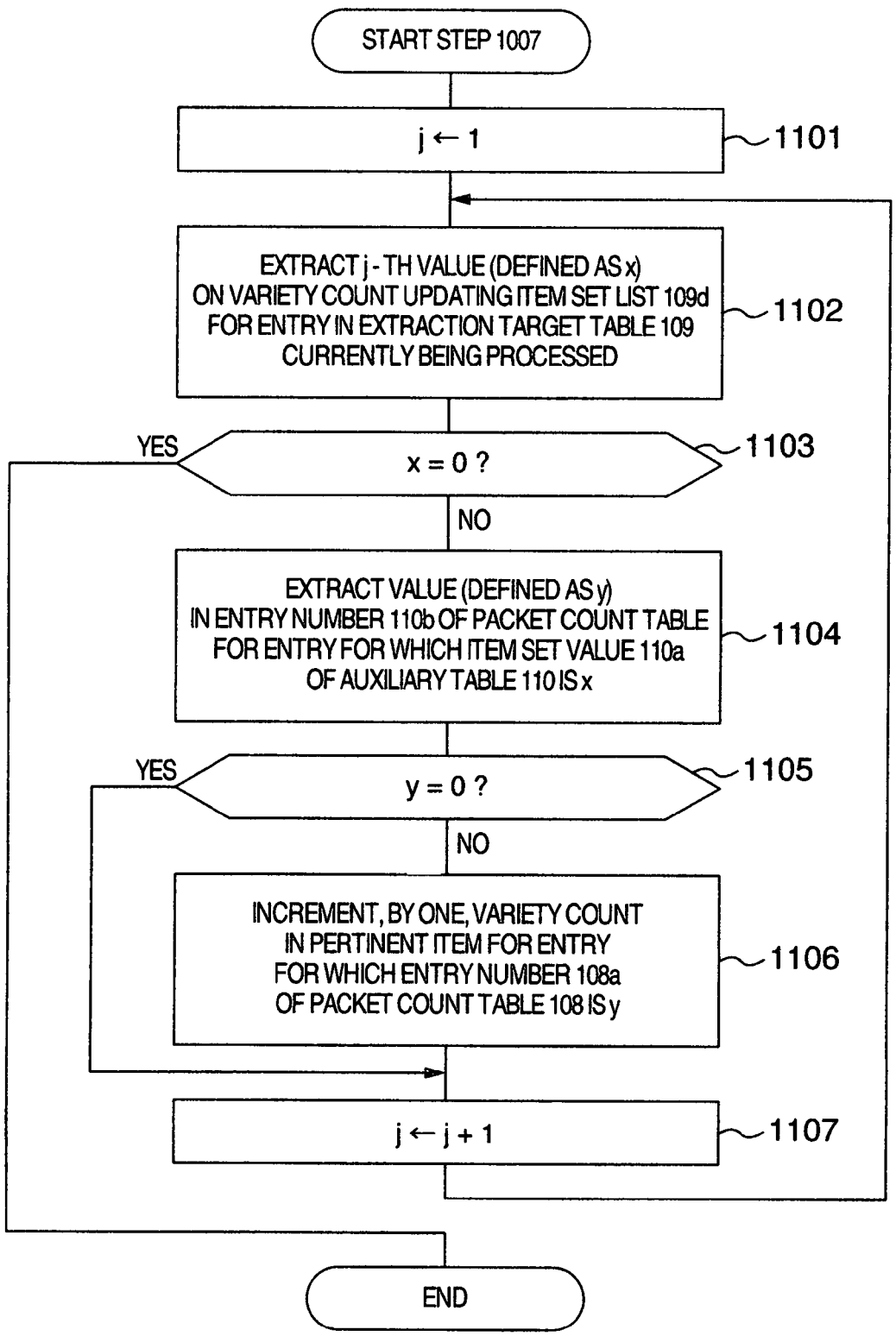
FIG. 11 is a flowchart showing a variety counting process.

In this embodiment, during the process performed at step 1210, the packet estimation unit 122 employs information included in an entry in the packet count table 108, for which a packet count has exceeded a threshold value in the process at step 1008 in the flowchart in FIG. 10, and updates the information included in an entry that is found at step 1208, or an entry that is newly registered at step 1209. Specifically, the P2P estimation flow detection count 212c is incremented by one, and the DIP variety count average 212e and the DPT variety count average 212f are calculated.

Here, prior to explaining the definitions of the DIP variety count average 212e and the DPT variety count average 212f, the P2P file exchange host estimation method of this embodiment will be described.

Figure 20:
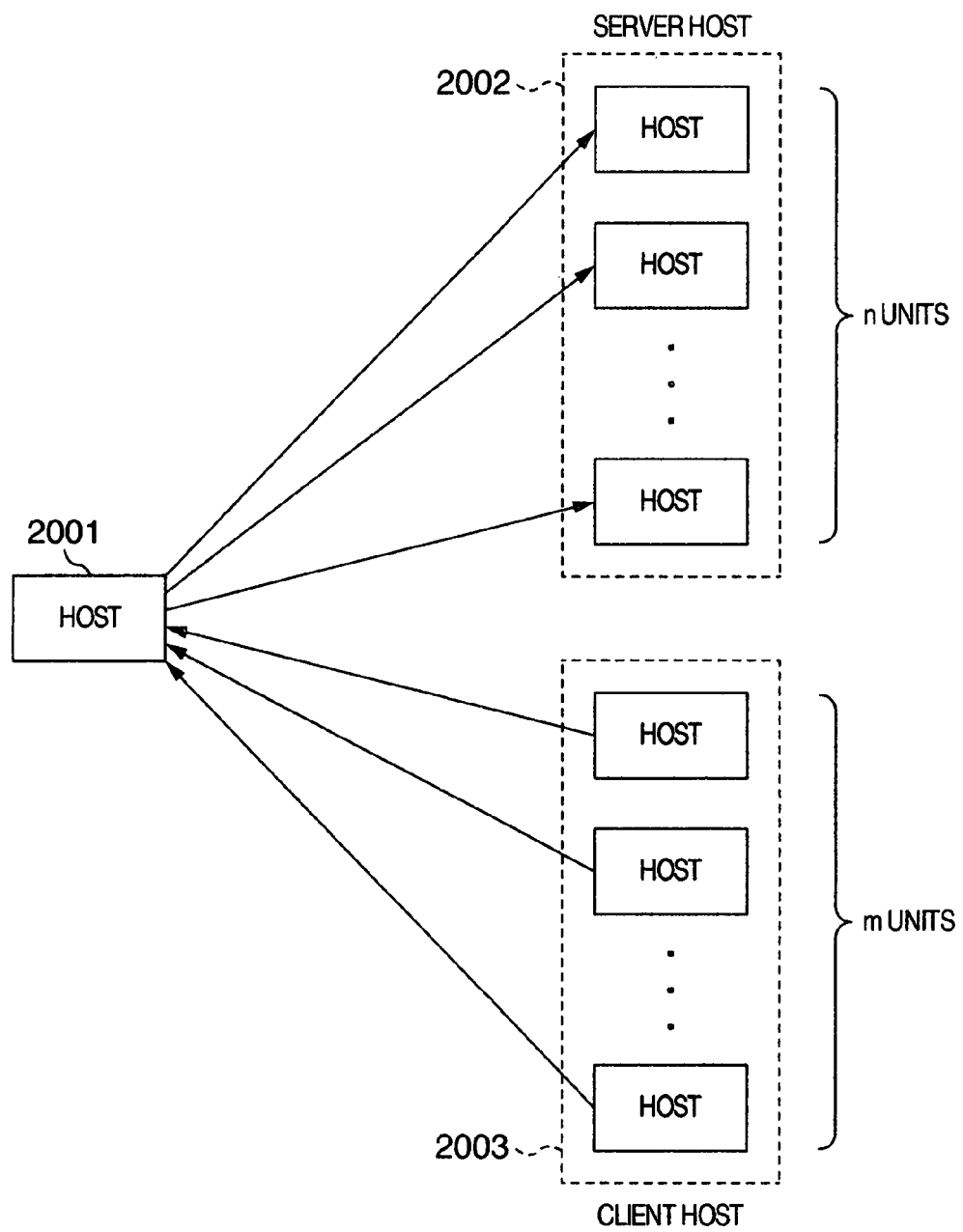
FIG. 20 is a diagram for explaining the outline of a P2P file exchanging process of the second embodiment.

FIG. 20 is a schematic diagram showing flows for P2P file exchange. In FIG. 20, a host 2001 is currently performing a P2P file exchange, while n hosts denoted by 2002 serve as servers relative to the host 2001, and m hosts denoted by 2003 serve as clients relative to the host 2001, all of which are currently performing P2P file exchanges. As a P2P file exchange protocol assumed in this embodiment, a service port number used when a host is operated as a server is determined at random for each host, and a detection threshold value sufficiently larger than n and m is designated in the threshold value 109c of the extraction target table 109. With this arrangement, for a P2P estimation flow that is detected because it exceeds the threshold value and that employs the host 2001 as a transmission source IP address, a value almost of n is applied for the destination IP address variety count and the destination port number variety count. This is because at step 1906 in the flowchart in FIG. 19, a packet used for the statistical process is limited to a TCP SYN packet, and in the arrangement in FIG. 20, all TCP SYN packets transmitted by the host 2001 are forwarded only to the hosts 2002. Therefore, in this embodiment, the following method is employed. The destination IP address variety count and the destination port number variety count are sufficiently great that these values can be regarded as the number of access servers for P2P file exchanges. In addition, when the host having the transmission IP address is entered as a server in the host table 111, it is estimated that the flow is a P2P file exchange flow.

Specifically, in this embodiment, as a method for performing the above described estimation, an average variety count for the destination IP addresses, included in a P2P estimation flow that is extracted, and an average variety count for the average destination port number are calculated. Then, these averages are compared with estimation threshold values that are designated in advance. When the averages are greater than the threshold values, it is estimated that the flow is a P2P file exchange flow. The average of the destination IP address variety count and the average of the destination port number variety count are, respectively, the DIP variety count average 212e and the DPT variety count average 212f; and the estimation threshold values are a P2P estimation, DIP variety count threshold value 213c and the P2P estimation, DPT variety count threshold value 213d. The comparison process and the process for affecting the estimation results to the P2P estimation results 212d of the P2P extraction table 212 correspond to the process at step 1211 of this embodiment.

The operation of the traffic analysis apparatus 201 for the second embodiment of the present invention has been described.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A traffic analysis apparatus, for analyzing traffic consisting of packets that flow via a network, comprising:
   a packet transmitter/receiver that transmits and receives packets that flow via the network, each of the packets having a plurality of items;
   a packet aggregating unit that counts the number of packets having predetermined values in respective items of a first item group, the first item group being selected from said plurality of items;
   a variety aggregating unit that counts the number of different values in at least one item selected from said plurality of items, but not included in the first item group;
   an analysis information storage unit that stores results obtained by analyzing the packets, the results including: an item set value that identifies a flow type; a total value of packets aggregated by the packet aggregating unit; and the number of different values counted by the variety aggregating unit; and
   a packet estimation unit that, when a total number of the packets counted by said packet aggregating unit exceeds a threshold value, estimates characteristics for an item set, the item set including a specific combination of packets,
   wherein said packet estimation unit estimates the characteristics for the item set based on the number of packets, the values of said respective items included in the first item group, and the number of different values counted by the variety aggregating unit,
   wherein said respective items include a transmission source address, and wherein said packet estimation unit determines the flow type based on the item set value for which the total number of the packets counted by said packet aggregating unit exceeds the threshold value,
   wherein said packet estimation unit determines that the flow type is a P2P (peer-to-peer) file exchange flow when the number of packets having the same value for the item of said transmission source address exceeds a predetermined threshold value, and when the ratio of the number of different values counted by said variety aggregating unit for items of a destination IP (Internet Protocol) address, a transmission source port number, and a destination port number, which are not included in said first item group, matches a predetermined ratio.

2. The traffic analysis apparatus according to claim 1, wherein the variety aggregating unit counts the number of different values for items that do not belong to a specific item group consisting of an arbitrary item or multiple items in packets received by the packet transmitter/receiver, at the first appearance of packets having the same value in an arbitrary item or multiple items of an item group consisting of items which do not belong to the specific item group.

3. The traffic analysis apparatus according to claim 1, wherein the packet aggregating unit uses a predetermined number of sets of analysis information included in the analysis information storage unit, and wherein when candidate analysis information that is included in the analysis information storage unit to be used for a new item group is currently used by a different item group, analysis information used by the different item group is abandoned, and the analysis information is used as information analysis information for the new item group.

4. The traffic analysis apparatus according to claim 3, wherein the packet aggregating unit selects a plurality of candidates as the analysis information to be used for the new item group, and when all the candidates are currently used by different item groups, analysis information is selected for which the minimum value is stored in the analysis information storage unit.

5. The traffic analysis apparatus according to claim 1, wherein the packet transmitter/receiver receives sampled packets via the network.

6. The traffic analysis apparatus according to claim 1, wherein the packet aggregating unit counts, among the packets received by the packet transmitter/receiver, the number of packets having the same value in each item of a second item group comprising items of a destination IP address and a destination port number and the number of packets having the same value in each item of a third item group comprising items of a transmission source IP address and a transmission source port number,
wherein the traffic analysis apparatus further comprises a host information storage unit storing therein the value of the destination IP address included in the second item group or the value of the transmission source IP address included in the third item group when the counted number of packets having the same value in each item included in the second item group or the counted number of packets having the same value in each item included in the third item group exceeds a predetermined threshold value, and
wherein the packet estimation unit estimates that the flow is a P2P file exchange flow when the ratio of the numbers of different values counted by said variety aggregating unit for the items of the destination IP address, the transmission source port number, and the destination port number which are not included in said first item group matches a predetermined ratio and the value of the transmission source IP address included in the first item group has been stored in said host information storage unit.

7. The traffic analysis apparatus according to claim 1, wherein said packet estimation unit performs a host information extraction process, and
wherein said host information extraction process is a process for estimating the operation of a host related to the flow type that is determined by said packet estimation unit.

8. A traffic analysis method, for a traffic analysis apparatus that analyzes traffic consisting of packets that flow via a network, the traffic analysis apparatus comprising a processor, the method comprising:
receiving, by the traffic analysis apparatus, packets, each of the packets having a plurality of items, that flow via the network;
counting, by the traffic analysis apparatus, the number of packets having predetermined values in respective items of a first item group selected from said plurality of items,
counting, by the traffic analysis apparatus, the number of different values in at least one item selected from said plurality of items, but not included in said first item group;

storing, by the traffic analysis apparatus, results obtained by analyzing the packets, the results including: an item set value that identifies a flow type; a total value of packets aggregated by the traffic analysis apparatus; and the number of different values counted by the traffic analysis apparatus; and
when a total number of the packets counted by the traffic analysis apparatus exceeds a threshold value, producing, by the traffic analysis apparatus, characteristics for an item set, the item set including a specific combination of packets,
wherein the characteristics for the item set are estimated in accordance with the number of packets counted in the step of counting the number of packets, and the number of different values counted in the step of counting the number of different values,
wherein said respective items include a transmission source address; and
determining, by the traffic analysis apparatus, the flow type based on the item set value for which the total number of the packets counted by said traffic analysis apparatus exceeds the threshold value; and
determining that the flow is a P2P (peer-to-peer) file exchange flow when the number of packets having the same value for the item of said transmission source address exceeds a predetermined threshold value, and when the ratio of the number of different values counted by said variety aggregating unit for items of a destination IP (Internet Protocol) address, a transmission source port number, and a destination port number, which are not included in said first item group, matches a predetermined ratio.

9. The traffic analysis method according to claim 8, further comprising:
counting, among the received packets, the number of packets having the same value in each item of a second item group comprising items of a destination IP address and a destination port number and the number of packets having the same value in each item of a third item group comprising items of a transmission source IP address and a transmission source port number;
storing, in a host information storage unit, the value of the destination IP address included in the second item group or the value of the transmission source IP address included in the third item group when the counted number of packets having the same value in each item included in the second item group or the counted number of packets having the same value in each item included in the third item group exceeds a predetermined threshold value; and
estimating that the flow is a P2P file exchange flow when the ratio of the numbers of different values for items of the destination IP address, the transmission source port number, and the destination port number which are not included in said first item group matches a predetermined ratio and the value of the transmission source IP address included in the first item group has been stored in said host information storage unit.

10. The traffic analysis method according to claim 8, wherein said traffic analysis apparatus performs a host information extraction process, and
wherein said host information extraction process is a process for estimating the operation of a host related to the flow type that is determined by said traffic analysis apparatus.

* * * * *